US008903599B2

(12) United States Patent
Sato et al.

(10) Patent No.: US 8,903,599 B2
(45) Date of Patent: Dec. 2, 2014

(54) FAILURE DETERMINATION DEVICE FOR SHUTTER DEVICE OF VEHICLE

(75) Inventors: Daisuke Sato, Wako (JP); Hidetaka Maki, Wako (JP); Hiroyuki Ohnishi, Wako (JP); Masatoshi Endo, Wako (JP); Yoshikazu Oshima, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/819,524

(22) PCT Filed: Aug. 10, 2011

(86) PCT No.: PCT/JP2011/068259
§ 371 (c)(1),
(2), (4) Date: Feb. 27, 2013

(87) PCT Pub. No.: WO2012/029521
PCT Pub. Date: Mar. 8, 2012

(65) Prior Publication Data
US 2013/0184943 A1    Jul. 18, 2013

(30) Foreign Application Priority Data

Aug. 31, 2010  (JP) ................................. 2010-193810

(51) Int. Cl.
| | |
|---|---|
| *G06F 17/00* | (2006.01) |
| *B60H 1/00* | (2006.01) |
| *B60K 11/08* | (2006.01) |
| *B60H 1/32* | (2006.01) |

(52) U.S. Cl.
CPC ............ *G06F 17/00* (2013.01); *B60H 1/00978* (2013.01); *B60K 11/085* (2013.01); *B60H 1/00871* (2013.01); *B60H 2001/326* (2013.01)
USPC ........... 701/34.4; 701/49; 701/36; 123/41.01; 123/41.04; 123/41.07

(58) Field of Classification Search
CPC ...................................................... B60K 11/085
USPC ............... 701/34.4, 49, 36; 123/41.01, 41.04, 123/41.07
See application file for complete search history.

(56) References Cited

U.S. PATENT DOCUMENTS

| | | | | | |
|---|---|---|---|---|---|
| 4,779,577 | A | * | 10/1988 | Ritter et al. ................. | 123/41.05 |
| 6,701,738 | B2 | * | 3/2004 | Kobayashi et al. ............. | 62/262 |

(Continued)

FOREIGN PATENT DOCUMENTS

| | | |
|---|---|---|
| JP | 52-071035 | 6/1977 |
| JP | 06-010671 | 1/1994 |

(Continued)

OTHER PUBLICATIONS

International Search Report dated Nov. 15, 2011.

(Continued)

*Primary Examiner* — Thomas G Black
*Assistant Examiner* — Wae Louie
(74) *Attorney, Agent, or Firm* — Rankin, Hill & Clark LLP

(57) ABSTRACT

A failure determination device capable of performing failure determination for a shutter device of a vehicle with accuracy in a short time period. In an engine room of a vehicle, a condenser for a refrigeration cycle for an aircon is provided and at a front grille of the vehicle, a grille shutter device is provided for introducing ambient air for cooling the condenser into the engine room by opening a grille shutter. According to the failure determination device of the shutter device, a pressure of the refrigerant discharged from the condenser is detected as a refrigerant pressure. A failure of the grille shutter device is determined based on the refrigerant pressure, which changes at a large rate according to the opening/closing of the grille shutter, enabling failure determination with accuracy in a short time period.

10 Claims, 28 Drawing Sheets

(56) References Cited

U.S. PATENT DOCUMENTS

| | | |
|---|---|---|
| 8,256,387 B2* | 9/2012 | Taylor ............... 123/41.05 |
| 8,439,276 B2* | 5/2013 | Prior ............... 236/35.2 |
| 8,505,660 B2* | 8/2013 | Fenchak et al. ............... 180/68.1 |
| 8,820,102 B2* | 9/2014 | Shiraishi et al. ............... 62/186 |
| 8,825,308 B2* | 9/2014 | Nishimura et al. ............... 701/49 |
| 2007/0125106 A1 | 6/2007 | Ishikawa |
| 2009/0056385 A1* | 3/2009 | Maekawa ............... 68/12.16 |
| 2010/0147611 A1* | 6/2010 | Amano et al. ............... 180/68.1 |
| 2010/0269767 A1* | 10/2010 | Taylor ............... 123/41.05 |
| 2011/0204149 A1* | 8/2011 | Prior ............... 236/35.2 |
| 2012/0022742 A1* | 1/2012 | Nemoto ............... 701/36 |
| 2013/0184943 A1* | 7/2013 | Sato et al. ............... 701/49 |
| 2013/0223980 A1* | 8/2013 | Pastrick et al. ............... 415/1 |
| 2014/0238067 A1* | 8/2014 | Itou et al. ............... 62/324.6 |

FOREIGN PATENT DOCUMENTS

| | | |
|---|---|---|
| JP | 2003-035224 | 2/2003 |
| JP | 2003-170733 | 6/2003 |
| JP | 2004-268778 | 9/2004 |
| JP | 2009-184377 | 8/2009 |
| WO | 01/81109 | 11/2001 |

OTHER PUBLICATIONS

European Search Report dated Sep. 24, 2013, 3 pages.

* cited by examiner

F I G. 1
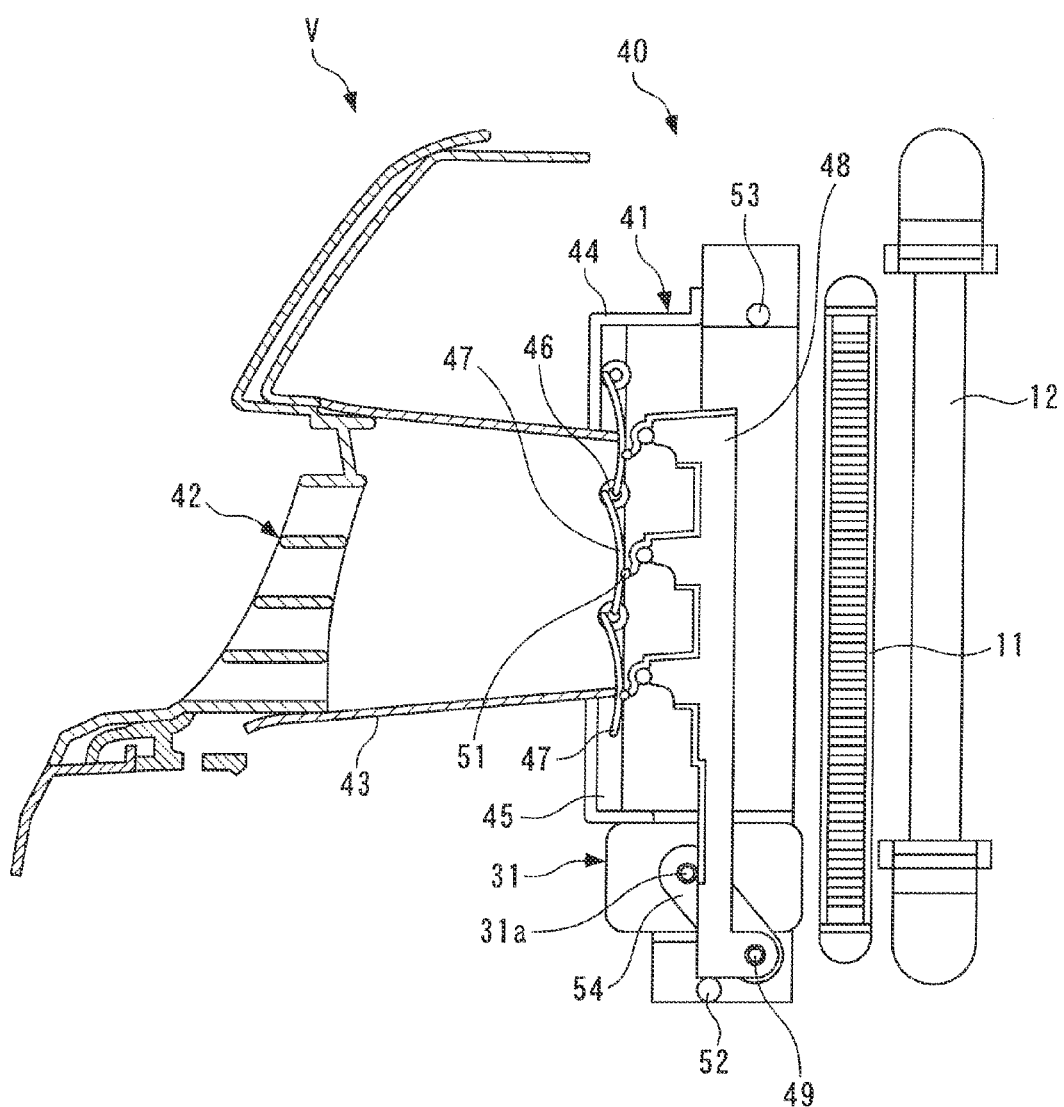

F I G. 2 7
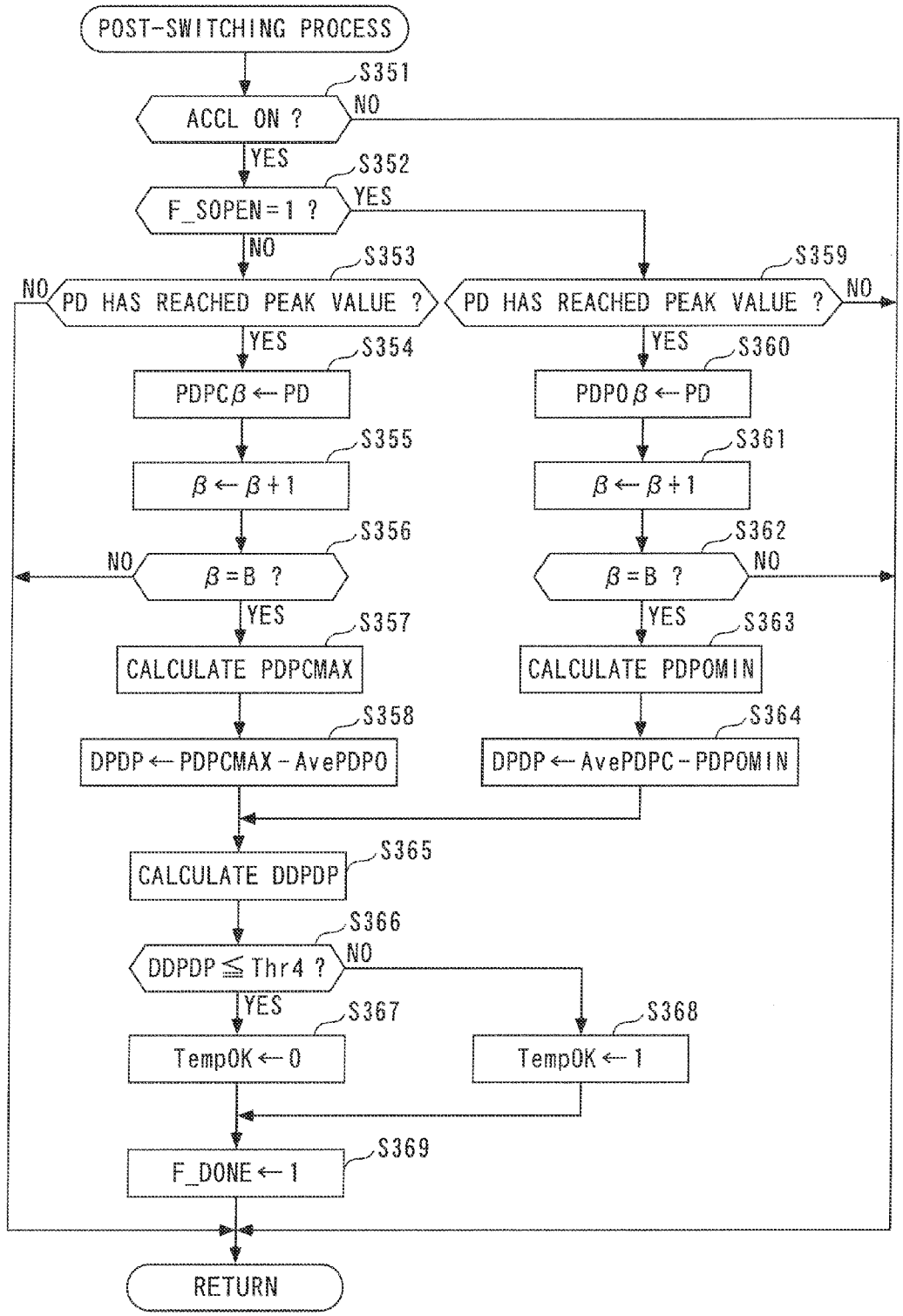

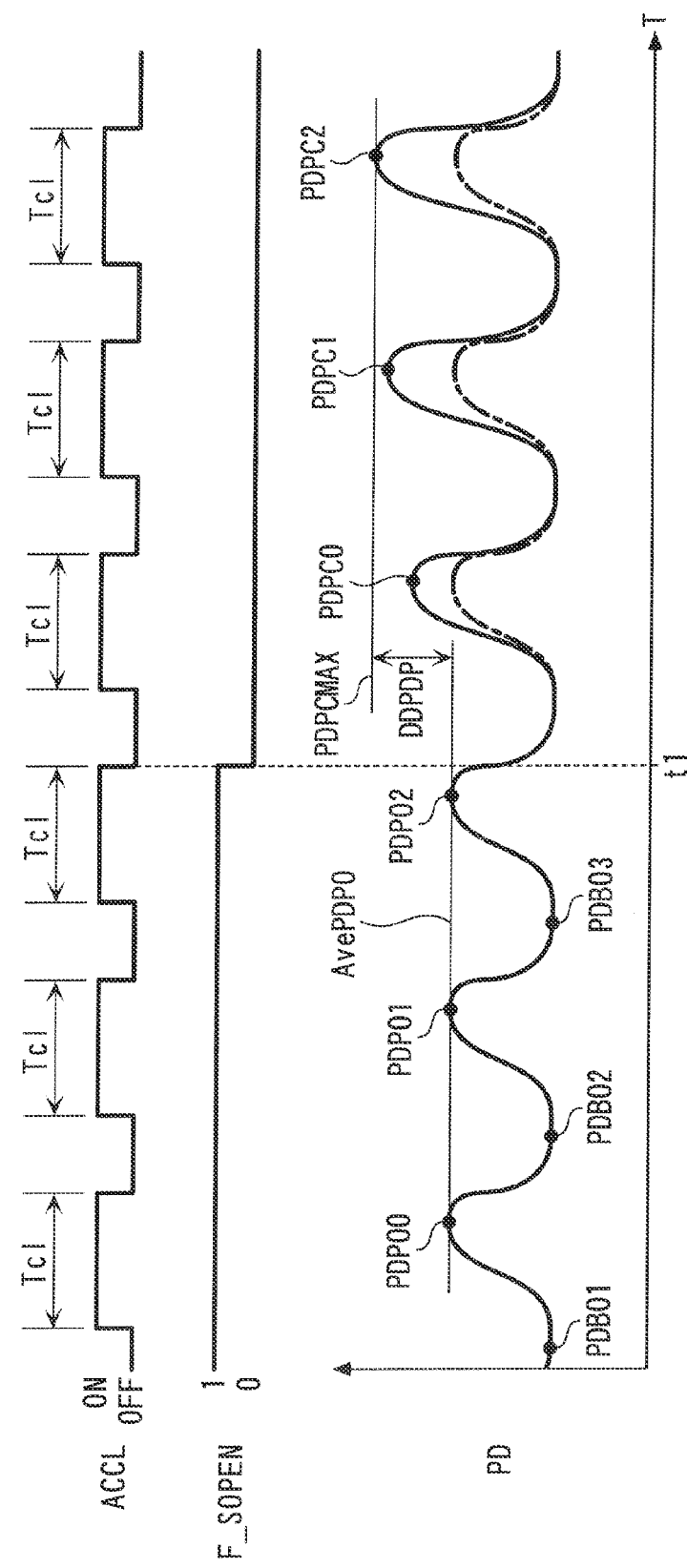

FAILURE DETERMINATION DEVICE FOR SHUTTER DEVICE OF VEHICLE

TECHNICAL FIELD

The present invention relates to a failure determination device for a shutter device of a vehicle that is openably and closably provided at a front opening of a vehicle, and determines a failure of a shutter device which introduces ambient air into an engine room.

BACKGROUND ART

As a conventional failure determination device for a shutter device of a vehicle of this kind, one described e.g. in PTL 1 is known. A radiator is disposed in an engine room of a vehicle, and in a front opening, a grille shutter is disposed for feeding ambient air for cooling the radiator. If a detected temperature of coolant in the engine (hereinafter referred to as "engine coolant temperature") is not lower than a predetermined temperature, the grille shutter is opened, and if it is lower than the predetermined temperature, the grille shutter is closed. With this, the amount of ambient air introduced into the engine room is controlled according to the engine coolant temperature, whereby the radiator is maintained at an appropriate temperature.

Further, in this failure determination device, when the engine coolant temperature at the time when a predetermined time has elapsed after the command to the grille shutter is switched from a closing command to an opening command is not lower than a first predetermined temperature A0, the engine coolant temperature has not lowered, and hence it is determined that the grille shutter is stuck on the closed side. Further, if the engine coolant temperature at the time when the opening command is continuously output to the grille shutter is higher than a second predetermined temperature B which is higher than the first predetermined temperature A0, it is too high for the engine coolant temperature to be assumed when the grille shutter is open, so that it is also determined that the grille shutter is stuck on the closed side.

CITATION LIST

Patent Literature

[PTL 1] JP 3117797 B

SUMMARY OF INVENTION

Technical Problem

However, a rate of change in the temperature of the coolant is small, and hence even if the grille shutter is opened from the closed state, a degree of lowering of the engine coolant temperature at the time is small. This is apt to lead to a determination error, and it is impossible to determine sticking of the grille shutter on the closed side with accuracy. In such a case, the grille shutter is actually stuck on the closed side, so that the radiator is not cooled, and hence there is a fear of causing a problem of overheating of the engine or deterioration of equipment in the engine room. Further, when the grille shutter is provided with a function of controlling aerodynamic characteristics of the vehicle by its opening degree, the function cannot be exerted, causing degradation of the handling of the vehicle.

In order to avoid such a determination error, for example, it is envisaged to detect the engine coolant temperature using a high-accuracy coolant temperature sensor, but in this case, the coolant temperature sensor is expensive, which causes an increase in costs. Alternatively, it is also envisaged to perform failure determination upon the lapse of time which is required for the engine coolant temperature to undergo a sufficient change after the grille shutter is opened. In this case, however, it takes a long time to perform failure determination, and hence there is a fear that a sufficient frequency of execution of failure determination cannot be secured.

The present invention has been made to provide a solution to such problems, and an object thereof is to provide a failure determination device for a shutter device of a vehicle, which can determine a failure of the shutter device with accuracy in a short time period.

Solution to Problem

To attain the above object, the invention according to claim 1 provides a failure determination device 1 for determining a failure of a shutter device of a vehicle V that has an engine room provided with a condenser 11 of a refrigeration cycle for an aircon 32, and has a front opening (front grille 42 in the embodiments (the same applies hereafter in this section)) provided with a shutter (grille shutter 47) which can be opened and closed, the shutter device being provided for introducing ambient air into the engine room for cooling the condenser 11 by opening the shutter, comprising refrigerant pressure detection means (refrigerant pressure sensor 21) for detecting a pressure of a refrigerant discharged from the condenser 11 as a refrigerant pressure PD, and failure determination means (ECU 2, steps 4 and 11 in FIG. 4, and steps 257 and 264 in FIG. 21) for determining a failure of the shutter device based on the detected refrigerant pressure PD.

In the engine room of the vehicle, the condenser for the refrigeration cycle for the aircon is provided and at the front opening of the vehicle, the shutter device is provided for introducing ambient air into the engine room for cooling the condenser by opening the shutter. According to the failure determination device for the shutter device, the pressure of the refrigerant discharged from the condenser is detected as the refrigerant pressure, and based on the detected refrigerant pressure, a failure of the shutter device is determined. The present invention is based on the following viewpoints: When the shutter is opened during the operation of the aircon, the condenser is cooled by ambient air introduced via the shutter, whereby the refrigerant in the condenser condenses to have its pressure reduced. On the other hand, when the shutter is closed, ambient air is shut off, whereby the condensation degree of the refrigerant in the condenser decreases to have its pressure increased. Such changes in the refrigerant pressure responsive to the opening/closing of the shutter clearly appear, differently from the case of the temperature of the coolant in the above-described conventional technique.

From these viewpoints, according to the present invention, since a failure of the shutter device is determined based on the refrigerant pressure which changes at a large rate in response to the opening/closing of the shutter, it is possible to determine a failure with accuracy in a short time period. For the same reason, without using a high-accuracy pressure sensor as pressure detection means for detecting the refrigerant pressure, it is possible to secure the accuracy of failure determination, which enables cost reduction.

The invention according to claim 2 is the failure determination device 1 as claimed in claim 1, further comprising opening/closing control means (ECU 2, steps 95 and 96 in FIG. 9, steps 157 and 158 in FIG. 12, and steps 227 and 228 in FIG. 16) for controlling opening/closing of the shutter by outputting an opening command or a closing command to the shutter device as an opening/closing command, and the failure determination means determines that a failure has occurred in the shutter device when a difference (refrigerant pressure difference DDPD for determination use) between a closing command-time refrigerant pressure which is a refrigerant pressure detected when the closing command has output from the opening/closing control means and an opening command-time refrigerant pressure which is a refrigerant pressure detected when the opening command has output, during operation of the aircon 32, is not larger than a predetermined value Thr (step 105 in FIG. 9, step 168 in FIG. 13, step 238 in FIG. 17, and step 367 in FIG. 27).

With this configuration, when the shutter device is normal, the shutter is opened according to the opening command output from opening/closing control means and is closed according to the closing command output from the same. Further, during the operation of the aircon, it is determined that a failure has occurred in the shutter device when the difference between the closing command-time refrigerant pressure detected when the closing command has been output and the opening command-time refrigerant pressure detected when the opening command has been output is not higher than the predetermined value. As mentioned above, the refrigerant pressure during the operation of the aircon is higher in the state in which the shutter is closed and is lower in the state in which the shutter is opened. Therefore, by the above-described failure determination, it is possible to properly determine that failure of the shutter device due to the sticking of the shutter has occurred, when the difference between the closing command-time refrigerant pressure and the opening command-time refrigerant pressure is not higher than the predetermined value.

The invention according to claim 3 is the failure determination device 1 as claimed in claim 2, further comprising reference timing-setting means (ECU 2) for setting a reference timing at which the opening/closing command from the opening/closing control means is switched, and opening/closing command-switching means (ECU 2, steps 332 to 334 in FIG. 25) for switching the opening/closing command between the opening command and the closing command at the set reference timing, wherein the refrigeration cycle has a compressor 13 for compressing and pressurizing the refrigerant, wherein the aircon 32 has an aircon clutch 14 for engaging/disengaging between the compressor 13 and a driving source (engine 3) of the compressor 13, and wherein the reference timing-setting means sets a timing in which the aircon clutch 14 is disengaged, as the reference timing (step 331 in FIG. 25).

With this configuration, by setting the timing in which the aircon clutch is disengaged, as the reference timing, simultaneously with disengagement of the aircon clutch, the opening/closing command from the opening/closing control means is switched between the closing command and the opening command. Therefore, even when the opening/closing of the shutter accompanies some delay, it is possible to positively terminate the opening/closing of the shutter after switching of the opening/closing command and before engagement of the aircon clutch. This makes it possible to properly acquire the refrigerant pressure during the operation of the aircon after switching the opening/closing of the shutter, while avoiding the influence of delay of the opening/closing of the shutter. As a result, it is possible to more properly determine a failure of the shutter device.

The invention according to claim 4 is the failure determination device 1 as claimed in claim 3, wherein the failure determination means uses values of the refrigerant pressure PD (opening command-time peak pressure PDPO and closing command-time peak pressure PDPC) detected when the refrigerant pressure has reached a peak after the aircon clutch 14 is engaged, before and after the reference timing, as the closing command-time refrigerant pressure and the opening command-time refrigerant pressure (steps 354 and 360 in FIG. 27).

As mentioned hereinabove, the refrigerant pressure during the operation of the aircon is higher in the state in which the shutter is closed and is lower in the state in which the shutter is opened. Further, when the aircon clutch is engaged, the refrigerant pressure temporarily increases, reaches a peak, then lowers, and converges to a fixed value dependent on the operation conditions at the time. With the configuration of this embodiment, values of the refrigerant pressure detected when the refrigerant pressure has reached a peak after engagement of the aircon clutch, before and after the reference timing, i.e. before and after the switching of the opening/closing command, respectively, are used as the closing command-time refrigerant pressure and the opening command-time refrigerant pressure, to thereby perform failure determination of the shutter device. Therefore, both of the closing command-time refrigerant pressure and the opening command-time refrigerant pressure for determination use can be properly acquired at definite points each of which can be used as a reference for the refrigerant pressure that rises according to the engagement of the aircon clutch, whereby it is possible to secure the accuracy of failure determination of the grille shutter device 41.

The invention according to claim 5 is the failure determination device 1 as claimed in claim 2, further comprising reference timing-setting means (ECU 2, and FIG. 6) for setting a reference timing at which the opening/closing command from the opening/closing control means is switched, and opening/closing command-switching means (ECU 2, steps 94 to 96 in FIG. 9, steps 156 to 158 in FIG. 12, and steps 226 to 228 in FIG. 16) for switching the opening/closing command between the closing command and the opening command at the set reference timing, wherein the failure determination means uses the refrigerant pressure detected when a predetermined time has elapsed after the opening/closing command is switched at the reference timing, as the closing command-time refrigerant pressure or the opening command-time refrigerant pressure.

With this configuration, the reference timing is set, and at the set reference timing, the opening/closing command from the opening/closing control means is switched between the opening command and the closing command. Further, the refrigerant pressure detected when the predetermined time has elapsed after the opening/closing command is switched is used as the closing command-time refrigerant pressure or the opening command-time refrigerant pressure, to thereby perform failure determination of the shutter device. As described above, a timing in which the opening/closing command is switched is set as the reference timing, and a sampling timing of the refrigerant pressure is set with reference to the reference timing. Therefore, it is possible to make uniform the sampling conditions of the refrigerant pressure used for determination, whereby it is possible to more properly determine a failure of the shutter device.

The invention according to claim 6 is the failure determination device 1 as claimed in claim 5, wherein the refrigeration cycle has a compressor 13 for compressing and pressurizing the refrigerant, wherein the aircon 32 has an aircon clutch 14 for engaging/disengaging between the compressor 13 and a driving source (engine 3) of the compressor 13, and wherein the reference timing-setting means sets a timing in which a predetermined delay time period (0 sec) has elapsed after the aircon clutch 14 is engaged, as the reference timing (steps 93 to 96 in FIG. 9).

As described hereinabove, when the aircon clutch is engaged, the compressor is operated, and in accordance therewith, the refrigerant pressure starts to rise. With the configuration of this embodiment, with reference to the engagement timing of the aircon clutch, the reference timing is set. Therefore, it is possible to switch the opening/closing command in a state in which the refrigerant pressure is actually increasing, whereby it is possible to properly determine a failure.

The invention according to claim 7 is the failure determination device 1 as claimed in claim 5, wherein the refrigeration cycle has a compressor 13 for compressing and pressurizing the refrigerant, wherein the aircon 32 has an aircon clutch 14 for engaging/disengaging between the compressor 13 and a driving source (engine 3) of the compressor 13, and wherein the reference timing-setting means sets a timing at which the refrigerant pressure PD has converged after the aircon clutch 14 is engaged, as the reference timing.

As described hereinabove, the refrigerant pressure rises according to the engagement of the aircon clutch, reaches a peak, then lowers, and converges to a fixed value dependent on the operation conditions at the time. With the configuration of this embodiment, the timing at which the refrigerant pressure has converged after the aircon clutch is engaged is set as the reference timing. Therefore, by switching the opening/closing command in the state in which the refrigerant pressure is stable, it is possible to exclude the influence of fluctuation of the refrigerant pressure, whereby it is possible to further enhance the accuracy of failure determination.

The invention according to claim 8 is the failure determination device 1 as claimed in claim 5, wherein the refrigeration cycle has a compressor 13 for compressing and pressurizing the refrigerant, wherein the aircon 32 has an aircon clutch 14 for engaging/disengaging between the compressor 13 and a driving source (engine 3) of the compressor 13, and wherein the reference timing-setting means sets a timing at which the refrigerant pressure PD has reached a peak after the aircon clutch 14 is engaged, as the reference timing (steps 154 to 158 in FIG. 12).

With this configuration, the timing at which the refrigerant pressure has reached a peak after the aircon clutch is engaged is set as the reference timing. Therefore, in comparison with the case where the timing at which the refrigerant pressure has converged is set as the reference timing, it is possible to determine a failure earlier and in a short time period. Further, a peak of the refrigerant pressure is a point which can be a reference for the refrigerant pressure which rises according to the engagement of the aircon clutch, and hence by using the peak as the reference timing, it is possible to secure the accuracy of failure determination.

The invention according to claim 9 is the failure determination device 1 as claimed in claim 5, further comprising duration acquisition means (ECU 2 and step 3 in FIG. 4) for acquiring a duration (aircon operation time period Tcl) of an engaged state of the aircon clutch 14, and wherein the reference timing-setting means sets the reference timing according to the acquired duration (FIG. 6).

The engagement time period of the aircon clutch is usually set in a manner varied according to the engine speed, the ambient air temperature, etc. When the set engagement time period of the aircon clutch is relatively long, by setting, for example, the timing at which the refrigerant pressure has converged as the reference timing, it is possible to determine a failure with higher accuracy. On the other hand, when the engagement time period is short, there is a fear that before the refrigerant pressure has converged, or before the refrigerant pressure has reached a peak, the aircon clutch is disengaged, making it impossible to complete failure determination. With the configuration of this embodiment, the duration of the engagement time period of the aircon clutch is acquired and according to the acquired duration, the reference timing is set. Therefore, according to the engagement time period of the aircon clutch, it is possible to set the most appropriate reference timing and properly perform failure determination.

The invention according to claim 10 is the failure determination device 1 as claimed in claim 5, further comprising average value-calculating means (ECU 2, step 84 in FIG. 8, step 147 in FIG. 11, and step 217 in FIG. 15) for calculating an average value (refrigerant pressure average value AveDPD) of a plurality of values of the refrigerant pressure detected in a state in which the aircon clutch 14 is engaged, when the engagement/disengagement of the aircon clutch 14 is repeated a plurality of times in a state in which the opening/closing command from the opening/closing control means is maintained to be one of the opening command and the closing command, respectively, wherein the failure determination means determines a failure of the shutter device based on a difference (refrigerant pressure difference JudDPD) between the refrigerant pressure detected when a predetermined time Tend has elapsed after the opening/closing command is switched from the state maintained to be one of the opening command and the closing command to a state maintained to be the other, and the calculated average value (refrigerant pressure difference DDPD for determination use).

With this configuration, when the engagement/disengagement of the aircon clutch is repeated a plurality of times in the state in which the opening/closing command is maintained to be one of the opening command and the closing command, a average value of a plurality of values of the refrigerant pressure detected in each engaged state of the aircon clutch is calculated. Then, a failure of the shutter device is determined based on the difference between the refrigerant pressure subsequently detected when the predetermined time has elapsed after the opening/closing command is switched from one of the opening command and the closing command to the other, and the above average value. As described above, as for the refrigerant pressure before switching the opening/closing command, an average value of a plurality of detected values of the refrigerant pressure is used, whereby it is possible to exclude the influence of temporary fluctuation and variation of the refrigerant pressure, whereby it is possible to further enhance the accuracy of failure determination.

The invention according to claim 11 is the failure determination device 1 as claimed in any one of claims 1 to 10, further comprising operation condition acquisition means (ECU 2, and steps 26 and 27 in FIG. 5) for acquiring operation conditions of the aircon 32, and failure determination inhibition means (ECU 2, steps 26, 27 and 34 in FIG. 5, and step 52 in FIG. 7) for inhibiting failure determination of the shutter device by the failure determination means (ECU 2, steps 26, 27 and 34, and step 52 in FIG. 7) when the acquired operation conditions of the aircon are different between when the closing command is output and when the opening command is output.

In a case where the operation conditions of the aircon are changed, for example, in a case where the temperature setting of the aircon is changed or inside air circulation/outside air introduction is switched, the refrigerant pressure varies accordingly. With the configuration of this embodiment, the failure determine of the shutter device is inhibited when the operation conditions of the aircon are different between when the closing command is output and when the opening command is output. This makes it possible to positively avoid a determination error caused by a change in the operation conditions of the aircon.

BRIEF DESCRIPTION OF THE DRAWINGS

FIG. 1 A cross-sectional view of a ventilation device of a vehicle in a state in which a grille shutter is closed.

FIG. 27 A flowchart showing a post-switching process according to the second embodiment.

FIG. 28 A timing diagram showing an operation example obtained by the pre-switching process and post-switching process according to the second embodiment in a case where the opening/closing command is switched from the opening command to the closing command.

DESCRIPTION OF EMBODIMENTS

Figure 2:
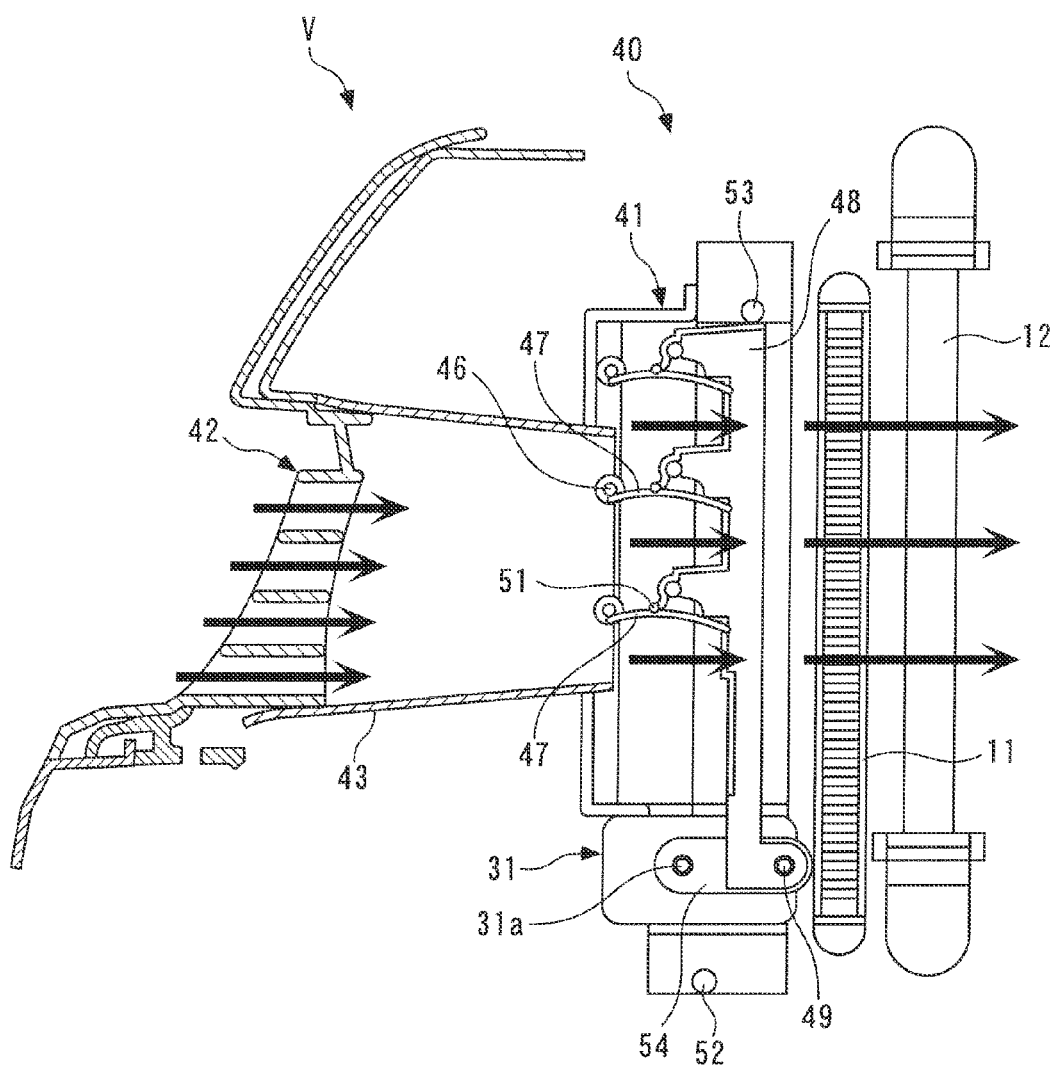
FIG. 2 A cross-sectional view of the ventilation device of the vehicle in a state in which the grille shutter is opened.

Hereinafter, preferred embodiments of the present invention will be described with reference to drawings. As shown in FIG. 1, a vehicle V that mounts a failure determination device 1 to which is applied the present invention includes a ventilation device 40 at a front part thereof. The ventilation device 40 includes a grille 42, a duct 43, and a grille shutter device 41, in the mentioned order from the front side of the vehicle V (from the left side of the figure), and rearward of these, there are provided a condenser 11 and a radiator 12 of an aircon 32, referred to hereinafter.

The grille shutter device 41 includes a shutter base 44, a support member 45 which vertically extends within the shutter base 44, a plurality of horizontal shafts 46 which are supported by the support member 45, and a grille shutter 47 which is pivotally mounted on each shaft 46. Each grille shutter 47 is pivotally connected, via a joint 51, to a slide link 48 which vertically extends. The slide link 48 is urged upward by a spring (not shown), whereby, in normal times, an upper end of the slide link 48 is in abutment with an upper stopper 53 and the grille shutter 47 is pivoted about the shaft 46 toward the closed side (clockwise). Further, the slide link 48 is connected, via a connection pin 49 and an arm link 54, to a rotating shaft 31a of a motor 31. Further, in a state in which the grille shutter 47 is closed as shown in FIG. 1, a lower end of the slide link 48 is in abutment with a lower stopper 52.

The motor 31 is formed by a DC motor whose rotating shaft 31a rotates within a predetermined angle range. When the rotating shaft 31a rotates counterclockwise from the state shown in FIG. 1, along with the pivotal movement of the arm link 54 performed in unison therewith, the slide link 48 is moved upward until it is brought into abutment with the upper stopper 53 located above. Along with the movement of the slide link 48, each grille shutter 47 is rotated counterclockwise about the shaft 46, and is changed to an open state shown in FIG. 2. The operation of the motor 31 is controlled by a control signal from an ECU 2, whereby the opening/closing of the grille shutter 47 is controlled. Hereinafter, such a control signal for opening/closing the grille shutter 47 from the ECU 2 is called "the opening/closing command to the grille shutter device 41", or simply "the opening/closing command".

In the open state of the grille shutter 47, ambient air flowing into the vehicle V through the grille 42 during traveling of the vehicle V is guided by the duct 43 to pass through the condenser 11 and the radiator 12, and is then vented out to the atmosphere. While the ambient air thus passes, heat is removed from refrigerant flowing through the condenser 11 and coolant flowing through the radiator 12, whereby the refrigerant and the coolant are cooled.

Figure 3:
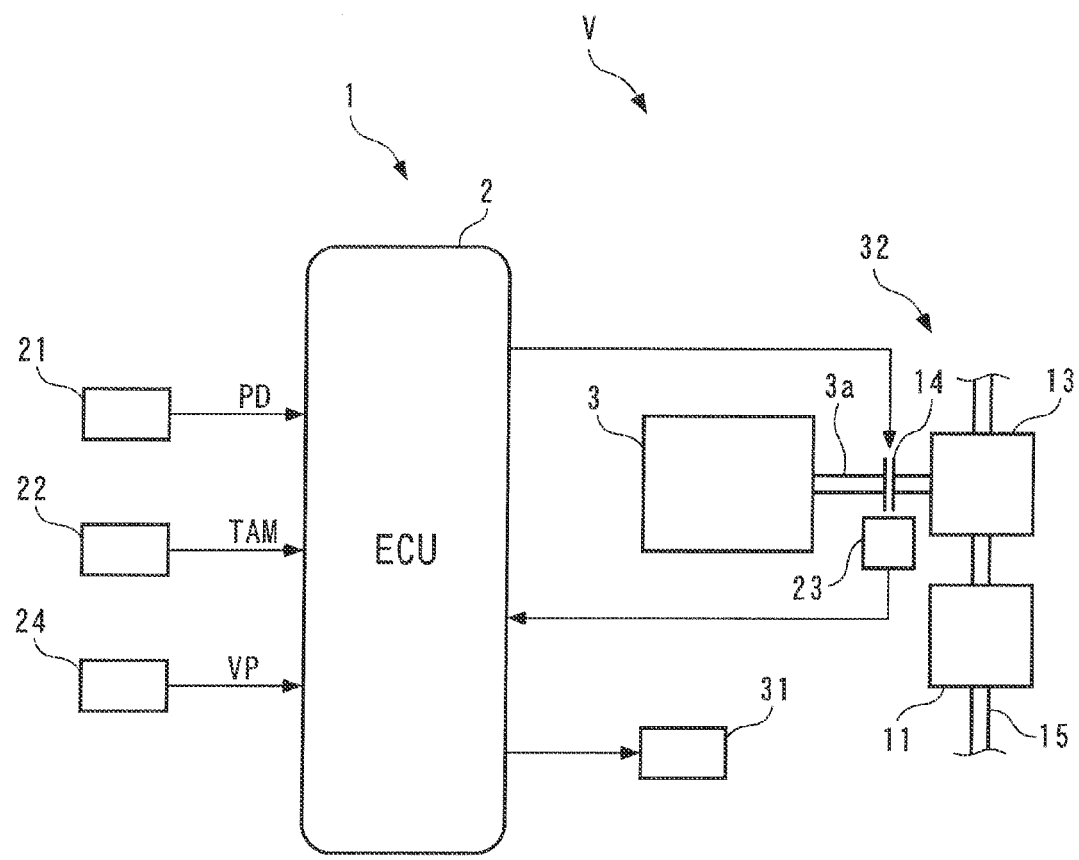
FIG. 3 A block diagram of a failure determination device for a grille shutter device according to an embodiment of the present invention.

As shown in FIG. 3, the vehicle V mounts the air conditioner (hereinafter referred to as "the aircon") 32 for cooling the inside of a driver's compartment (not shown). The above-mentioned condenser 11 constitutes a refrigeration cycle of the aircon 32, together with a compressor 13, an evaporator (not shown), etc.

The compressor 13 is connected to a crankshaft 3a of an engine 3, via an electromagnetic aircon clutch 14, etc. When the aircon clutch 14 is in an engaged state, the compressor 13 is driven by motive power of the engine 3, and compresses the refrigerant in the form of low-temperature low-pressure gas into the refrigerant in the form of high-temperature high-pressure gas, which is then sent to the condenser 11 via a refrigerant pipe 15. The load on the engine 3 caused by the compressor 13 becomes larger as the load on the aircon 32 becomes larger.

Each cylinder (not shown) of the engine 3 is provided with a fuel injection valve (not shown), and the fuel injection valve forms a mixture by injecting the fuel into the cylinder. Further, a valve-opening time period of the fuel injection valve and opening/closing timing are controlled by the ECU 2, whereby a fuel injection amount QINJ and fuel injection timing are controlled.

Further, the engagement/disengagement of the aircon clutch 14 is set according to the operation state of an aircon switch (not shown) provided in the driver's compartment, and is controlled by the ECU 2. Specifically, when the aircon switch is set to off by the operation of the driver, the aircon clutch 14 is disengaged, whereby the aircon 32 is held in a stopped state. When the aircon switch is on, the ECU 2 causes the aircon clutch 14 to be engaged or disengaged such that the temperature in the driver's compartment (hereinafter referred to as "compartment temperature") becomes a preset temperature set by the driver, thereby controlling the operation/stoppage of the aircon 32. Further, a state of engagement/disengagement of the aircon clutch 14 is detected by a clutch switch 23, and a detection signal indicative of the detected state is delivered to the ECU 2.

Further, a refrigerant pressure sensor 21 is provided in the refrigerant pipe 15 at a location immediately downstream of the condenser 11. The refrigerant pressure sensor 21 detects a pressure of the refrigerant flowing through the refrigerant pipe 15 (hereinafter referred to as "refrigerant pressure") PD, and delivers a detection signal indicative of the detected pressure to the ECU 2. Further, from an ambient air temperature sensor 22, a detection signal indicative of the temperature of the ambient air (hereinafter referred to as "ambient air temperature") TAM detected thereby and from a vehicle speed sensor 24, a detection signal indicative of a vehicle speed VP detected thereby which is the traveling speed of the vehicle V, are delivered, respectively, to the ECU 2.

The ECU 2 is implemented by a microcomputer (not shown) comprising a CPU, a RAM, a ROM, and an input/output interface (none of which are shown). The ECU 2 executes various processing operations based on control programs stored in the ROM, etc., according to detection signals from the above-mentioned sensors 21, 22 and 24 and clutch switch 23.

In the present embodiment, the ECU 2 corresponds to failure determination means, opening/closing control means, reference timing-setting means, opening/closing command-switching means, duration acquisition means, average value-calculating means, operation condition acquisition means, and failure determination inhibition means.

Next, a failure determination process for the grille shutter device 41 according to a first embodiment of the present invention will be described with reference to FIGS. 4 to 20. The failure determination process determines a failure of the grille shutter device 41 according to the refrigerant pressure PD, and FIG. 4 corresponds to a main routine, while FIGS. 5 to 17 correspond to subroutines. Each process is executed whenever a predetermined time period dT elapses.

Figure 4:
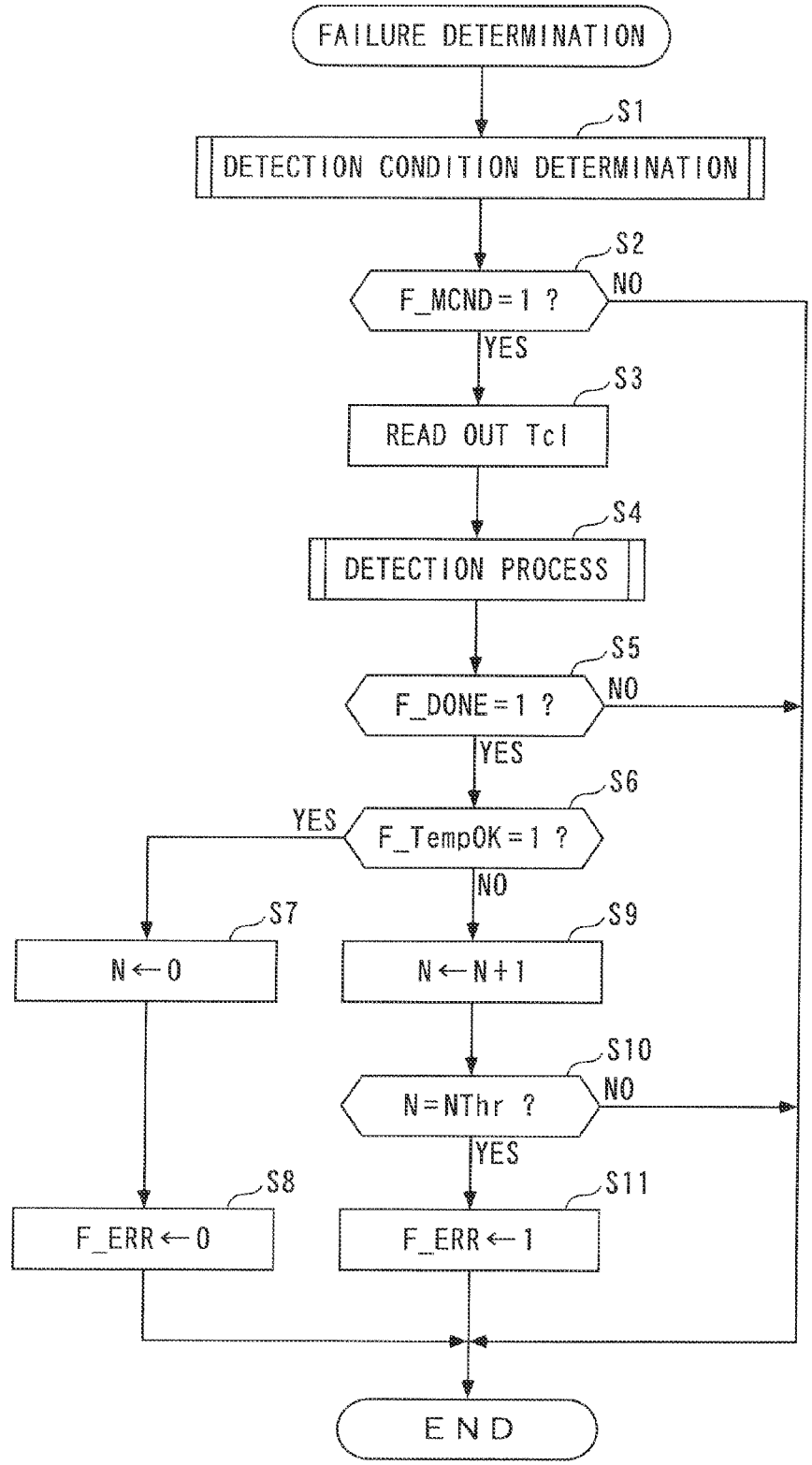
FIG. 4 A flowchart showing a failure determination process for the grille shutter device according to a first embodiment.
Figure 5:
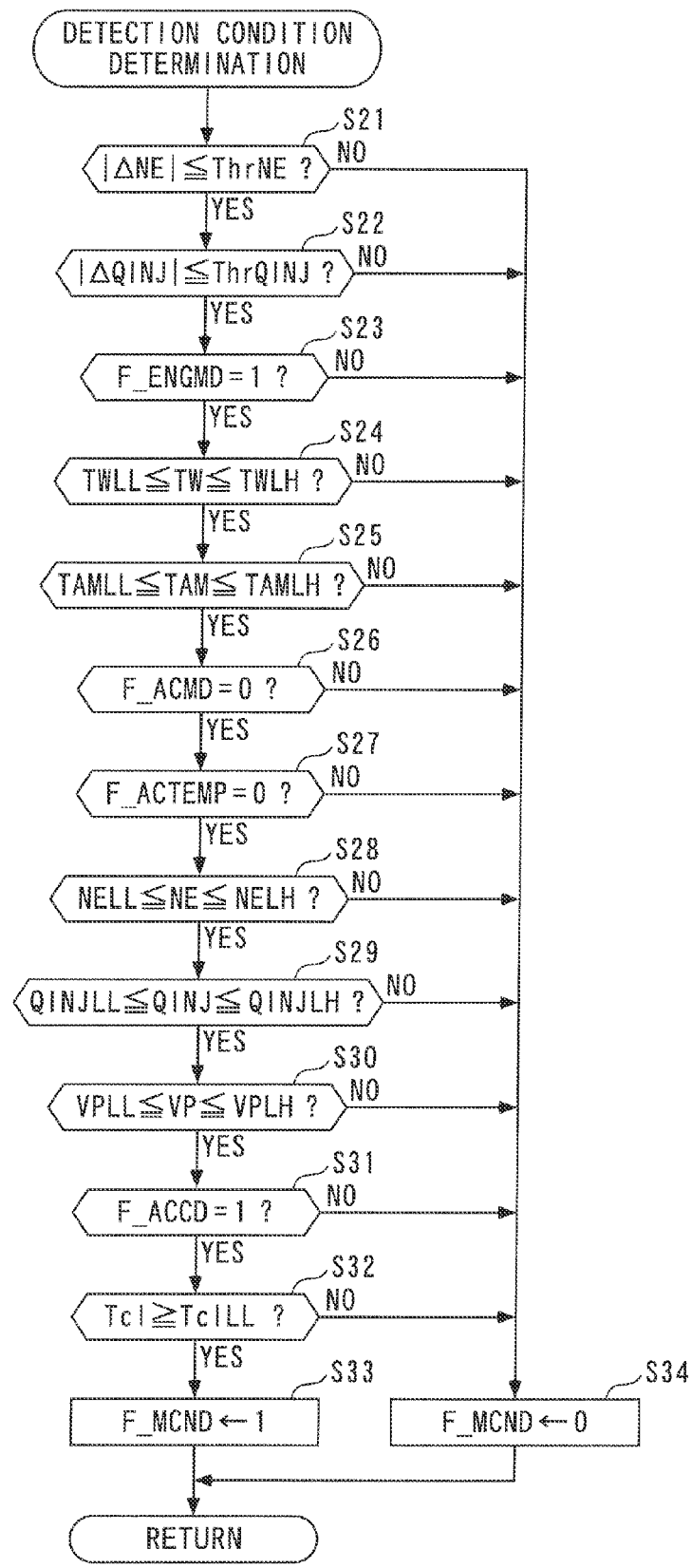
FIG. 5 A flowchart showing a detection condition determination process for failure determination of the grille shutter device.

In the main routine of FIG. 4, first, in a step 1 (denoted as "S1" in FIG. 4; steps mentioned hereinafter are also denoted in the same manner), a detection condition determination process is executed. The detection condition determination process determines whether or not a state of the engine 3 and a state of the aircon 32 are suitable for detecting a failure of the grille shutter device 41, and FIG. 5 shows a subroutine therefor.

In the present process, first, in steps 21 to 32, it is determined whether or not the following conditions (a) to (l) are satisfied, respectively.

(a) The absolute value |ΔNE| of a variation amount of an engine speed NE is not higher than a predetermined value ThrNE.
(b) The absolute value |ΔQINJ| of a variation amount of the fuel injection amount QINJ is not higher than a predetermined value ThrQINJ.
(c) An operation region flag F_ENGMD of the engine 3 is "1".
(d) An engine coolant temperature TW is in a predetermined range (TWLL≤TW≤TWLH).
(e) The ambient air temperature TAM is in a predetermined range (TAMLL≤TAM≤TAMLH).
(f) An aircon mode change flag F_ACMD is "0".
(g) An aircon setting change flag F_ACTEMP is "0".
(h) The engine speed NE is in a predetermined range (NELL≤NE≤NELH).
(i) The fuel injection amount QINJ is in a predetermined range (QINJLL≤QINJ≤QINJLH).
(j) The vehicle speed VP is in a predetermined range (VPLL≤VP≤VPLH).
(k) An aircon cool-down determination flag F_ACCD is "1".
(l) An aircon operation time period Tcl is not shorter than a predetermined minimum time period TclLL.

The above-mentioned operation region flag F_ENGMD is set to "1" when the engine 3 is in the predetermined operation region dependent on the engine speed NE and the fuel injection amount QINJ, by searching a predetermined map (not shown). Further, the aircon mode change flag F_ACMD is set to "1" when the setting of the aircon 32 is switched from one of inside air circulation and outside air introduction to the other thereof, and the aircon setting change flag F_ACTEMP is set to "1" when the setting of temperature or an air blown amount of the aircon 32 is changed. Further, the aircon cool-down determination flag F_ACCD is set to "1" when a duration of an engaged state of the aircon clutch 14 is shorter than a duration of a disconnected state of the same, continuously, not less than a predetermined number of times, and it indicates a state of termination of a highly-loaded operation immediately after turn-on of the aircon 32. Further, the aircon operation time period Tcl is a duration of the engaged state of the aircon clutch 14 and is set according to e.g. the engine speed NE, the ambient air temperature TAM, and the set temperature of the aircon 32.

If all the answers to these steps 21 to 32 are affirmative (YES), i.e. if all the conditions (a) to (l) are satisfied, it is determined that conditions for detecting a failure of the grille shutter device 41 are satisfied, and to indicate this, in a step 33, a detecting condition satisfaction flag F_MCND is set to "1", followed by terminating the present process. On the other hand, if any of the answers to the respective questions of the steps 21 to 32 is negative (NO), i.e. if any of the conditions (a) to (l) is not satisfied, it is determined that the detecting conditions are not satisfied, and in a step 34, the detecting condition satisfaction flag F_MCND is set to "0", followed by terminating the present process.

Referring again to FIG. 4, in a step 2 following the step 1, it is determined whether or not the detecting condition satisfaction flag F_MCND is "1". If the answer to this question is negative (NO), the present process is immediately terminated. On the other hand, if the answer to the question of the step 2 is affirmative (YES), i.e. if the detecting conditions are satisfied, in a step 3, the aircon operation time period Tcl is read out.

Figure 6:
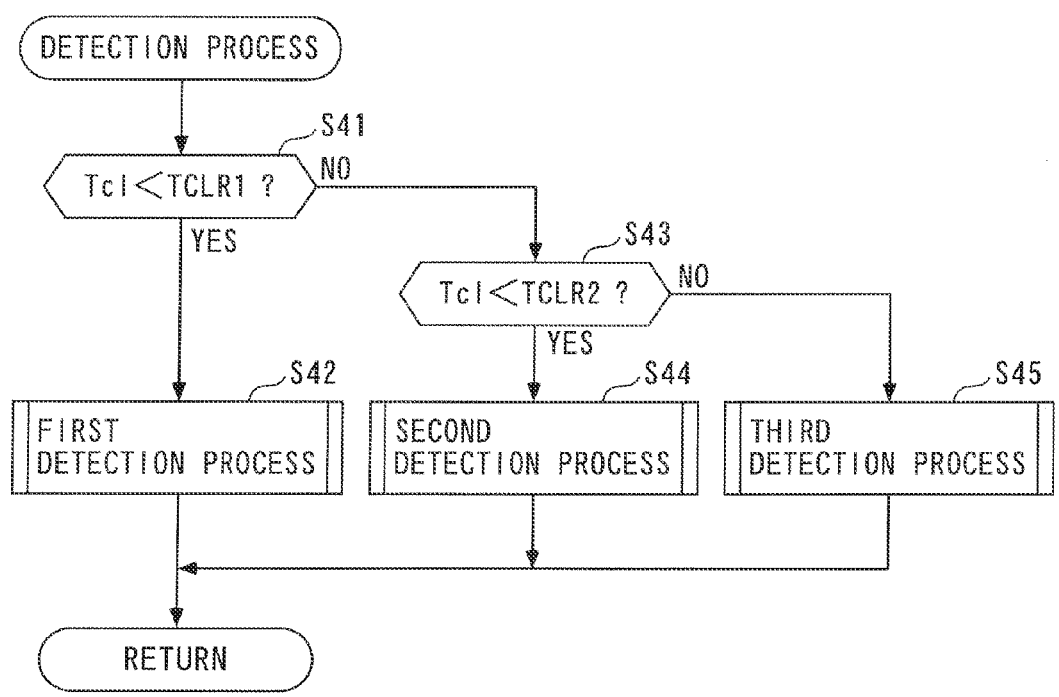
FIG. 6 A flowchart showing a detection process according to the first embodiment.

Next, in a step 4, a detection process for detecting a failure of the grille shutter device 41 is executed. FIG. 6 shows a subroutine therefor. In the present process, first, it is determined in a step 41 whether or not the aircon operation time period Tcl is shorter than a first predetermined time period TCLR1 which is longer than the minimum time period TclLL. If the answer to this question is affirmative (YES), i.e. if Tcl<TCLR1 holds, in a step 42, a first detection process, described hereinafter, is executed, followed by terminating the present process.

On the other hand, if the answer to the question of the step 41 is negative (NO), it is determined in a step 43 whether or not the aircon operation time period Tcl is shorter than a second predetermined time period TCLR2 which is longer than the first predetermined time period TCLR1. If the answer to this question is affirmative (YES), i.e. if TCLR1≤Tcl<TCLR2 holds, in a step 44, a second detection process, described hereinafter, is executed, followed by terminating the present process.

On the other hand, if the answer to the question of the above step 43 is negative (NO), i.e. if Tcl≥TCLR2 holds, in a step 45, a third detection process, described hereinafter, is executed, followed by terminating the present process.

Hereinafter, the first detection process executed in the step 42 in FIG. 6 will be described with reference to FIGS. 7 to 9. In the present process, first, it is determined in a step 51 in FIG. 7 whether or not a detection completion flag F_DONE is "1". This detection completion flag F_DONE is set to "1" when a first post-switching process, described hereinafter, is once terminated. If the answer to the question of this step 51 is affirmative (YES), in respective steps 56 to 63, a minimum value PDinimn of an initial value PDini, referred to hereinafter, is reset to a predetermined PDiniLH corresponding to a maximum value that the initial value PDini can assume, a maximum value PDinimx of the initial value PDini is reset to 0, a minimum value PDendmn of an end value PDend is reset to a predetermined PDendLH corresponding to a maximum value that the end value PDend can assume, and a maximum value PDendmx of the end value PDend is reset to 0, and further, an engagement time period Ton of the aircon clutch 14, an integrated value ΣDPD of a refrigerant pressure difference, a counter value k, all of which are referred to hereinafter, and the detection completion flag F_DONE are reset to 0, followed by terminating the present process.

On the other hand, if the answer to the question of the above step 51 is negative (NO), it is determined in a step 52 whether or not the detecting condition satisfaction flag F_MCND is "1". If the answer to this question is negative (NO), i.e. if the conditions for detecting a failure of the grille shutter device 41 are not satisfied, the above steps 56 to 63 are executed, followed by terminating the present process.

On the other hand, if the answer to the question of the above step 52 is affirmative (YES), it is determined in a step 53 whether or not the aircon clutch (ACCL) 14 has been disengaged before the lapse of a predetermined time period Tend after the aircon clutch 14 has been engaged. If the answer to this question is affirmative (YES), the above steps 56 to 63 are executed, followed by terminating the present process.

On the other hand, if the answer to the question of the above step 53 is negative (NO), it is determined in a step 54 whether or not the difference between the maximum value PDinimx and the minimum value PDinimn of the initial value (=PDinimx−PDinimn) is not larger than a predetermined value ThrPDini. If the answer to this question is negative (NO), it means that the initial value PDini is not stable, and hence the above steps 56 to 63 are executed, followed by terminating the present process.

On the other hand, if the answer to the question of the above step 54 is affirmative (YES), it is determined in a step 55 whether or not the difference between the maximum value PDendmx and the minimum value PDendmn of the end value PDend (=PDendmx−PDendmn) is not larger than a predetermined value ThrPDend. If the answer to this question is negative (NO), it means that the end value PDend is not stable, and hence the above steps 56 to 63 are executed, followed by terminating the present process.

On the other hand, if the answer to the question of the above step 55 is affirmative (YES), it is determined in a step 64 whether or not the counter value k has reached a predetermined number (for example, 3). If the answer to this question is negative (NO), a first pre-switching process is executed (step 65). On the other hand, if the answer to this question is affirmative (YES), the first post-switching process is executed (step 66), followed by terminating the present process. This first pre-switching process calculates an average value of a plurality of values of the refrigerant pressure PD each detected in an engaged state of the aircon clutch 14 when the engagement/disengagement of the aircon clutch 14 is repeated a plurality of times before switching of the opening/closing command to the grille shutter device 41. Further, the first post-switching process performs, after switching of the opening/closing command, provisional determination of failure of the grille shutter device 41, based on the detected refrigerant pressure PD and the above-mentioned average value before the switching.

Figure 8:
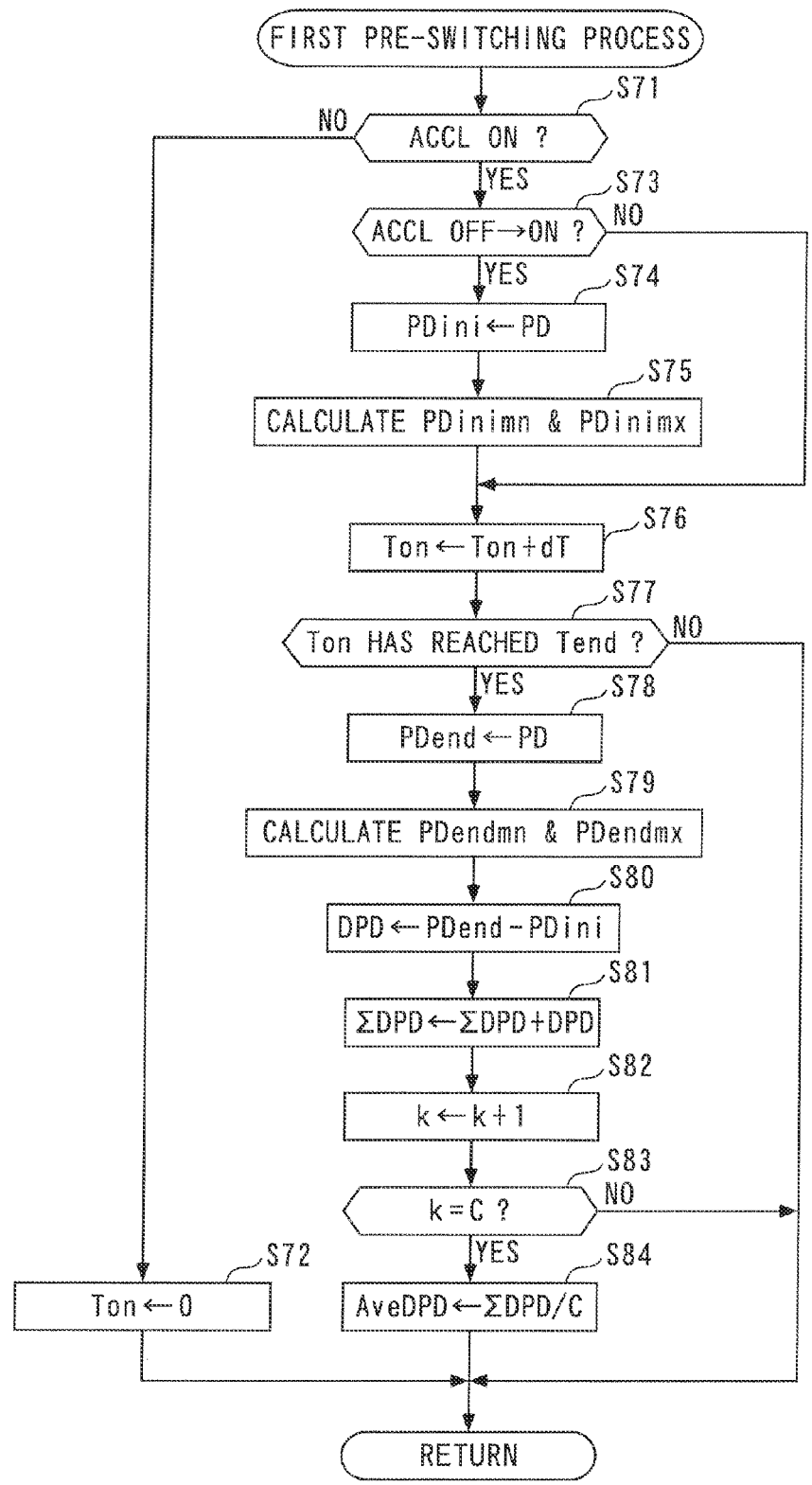
FIG. 8 A flowchart showing a first pre-switching process.

FIG. 8 shows a subroutine for the first pre-switching process. In the present process, first, it is determined in a step 71 whether or not the aircon clutch 14 has been engaged. If the answer to this question is negative (NO), in a step 72, the engagement time period Ton of the aircon clutch 14 is reset to 0, followed by terminating the present process.

On the other hand, if the answer to the question of the above step 71 is affirmative (YES), it is determined in a step 73 whether or not the aircon clutch 14 has been switched to the engaged state between the preceding execution and the present execution of this step. If the answer to this question is affirmative (YES), i.e. if it is immediately after the aircon clutch 14 has been engaged, in a step 74, a value of the refrigerant pressure PD at the time is stored as the initial value PDini. Next, in a step 75, a calculation process for calculating the minimum value PDinimn and the maximum value PDinimx of the initial value is executed, and the process proceeds to a step 76. On the other hand, if the answer to the question of the step 73 is negative (NO), the steps 74 and 75 are skipped and the process proceeds to the step 76.

The above-described calculation process compares the initial value PDini stored this time in the step 74 with the minimum value PDinimn and the maximum value PDinimx of the initial value calculated and stored up to last time, and if the initial value PDini is smaller than the minimum value PDinimn, the minimum value PDinimn is updated to the initial value PDini, and if the initial value PDini is larger than the maximum value PDinimx, the maximum value PDinimx is updated to the initial value PDini, and in the other cases, the minimum value PDinimn and the maximum value PDinimx are maintained. These minimum value PDinimn and maximum value PDinimx of the initial value are used for determining the stability of the initial value PDini in the step 54 in FIG. 7.

In the step 76 following the above step 73 or 75, the engagement time period Ton is calculated by adding the execution repetition period dT of the present process to the engagement time period Ton. Next, it is determined in a step 77 whether or not the engagement time period Ton has reached a predetermined time period Tend (for example, 3 sec). If the answer to this question is negative (NO), the present process is terminated. On the other hand, if the answer to the question of the step 77 is affirmative (YES), i.e. if it is immediately after the lapse of the predetermined time period Tend after the aircon clutch 14 has been engaged, in a step 78, a value of the refrigerant pressure PD at the time is stored as the end value PDend.

Next, in a step 79, a calculation process for calculating the minimum value PDendmn and the maximum value PDendmx of the end value is executed. This calculation process is executed similarly to the above-described calculation process for calculating the minimum value PDinimn and the maximum value PDinimx of the initial value. These minimum value PDendmn and maximum value PDendmx of the end value are used for determining the stability of the end value PDend in the step 55 in FIG. 7.

Next, in a step 80, the difference between this end value PDend and the initial value PDini stored in the step 74 (=PDend−PDini) is calculated as a refrigerant pressure difference DPD, and in accordance with this, by adding it to the refrigerant pressure integrated value ΣDPD calculated up to the time, the refrigerant pressure integrated value ΣDPD is calculated (step 81).

Next, in a step 82, the counter value k is incremented, and it is determined in a step 83 whether or not the counter value k has reached a predetermined value C. If the answer to this question is negative (NO), the present process is immediately terminated. On the other hand, if the answer to the question of the above step 83 is affirmative (YES), in a step 84, a value (=ΣDPD/C) obtained by dividing the refrigerant pressure integrated value ΣDPD by the predetermined value C is calculated as a refrigerant pressure average value AveDPD before the switching, followed by terminating the present process.

When the counter value k has reached the predetermined value C and the calculation of the refrigerant pressure average value AveDPD is completed, as described above, the answer to the question of the step 64 becomes affirmative (YES), and the first post-switching process is started. FIG. 9 shows a subroutine therefor. In the present process, first, it is determined in a step 91 whether or not the aircon clutch 14 has been engaged. If the answer to this question is negative (NO), in a step 92, the engagement time period Ton of the aircon clutch 14 is reset to 0, followed by terminating the present process.

On the other hand, if the answer to the question of the above step 91 is affirmative (YES), it is determined in a step 93 whether or not the aircon clutch 14 has been switched to the engaged state between the preceding execution and the present execution of this step. If the answer to this question is affirmative (YES), i.e. if it is immediately after the aircon clutch 14 has been engaged, it is determined in a step 94 whether or not an opening command flag F_SOPEN is "1". If the answer to this question is affirmative (YES), i.e. if the opening command has been output to the grille shutter device 41 up to the time, in a step 95, the opening command flag F_SOPEN is changed to "0". This cause the opening/closing command to the grille shutter device 41 to be switched from the opening command to a closing command.

On the other hand, if the answer to the question of the step 94 is negative (NO), i.e. if the closing command has been output to the grille shutter device 41 up to the time, in a step 96, the opening command flag F_SOPEN is changed to "1". This causes the opening/closing command to the grille shutter device 41 to be switched from the closing command to the opening command.

In a step 97 following the above step 95 or 96, a value of the refrigerant pressure PD at the time is stored as an initial value JudPDini and the process proceeds to a step 98. On the other hand, if the answer to the question of the above step 93 is negative (NO), i.e. if it is not immediately after the aircon clutch 14 has been engaged, the steps 94 to 97 are skipped and the process proceeds to the step 98.

In this step 98, the engagement time period Ton is calculated, by adding the execution repetition period dT to the engagement time period Ton. Next, it is determined in a step 99 whether or not the engagement time period Ton has reached the predetermined time period Tend. If the answer to this question is negative (NO), the present process is terminated. On the other hand, if the answer to the question of the above step 99 is affirmative (YES), i.e. if it is immediately after the lapse of the predetermined time period Tend after the aircon clutch 14 has been engaged, in a step 100, a value of the refrigerant pressure PD at the time is stored as an end value JudPDend.

Next, in a step 101, the difference between this end value JudPDend and the initial value JudPDini stored in the step 97 (=JudPDend−JudPDini) is calculated as a refrigerant pressure difference JudDPD, and further, the difference between the calculated refrigerant pressure difference JudDPD and the refrigerant pressure average value AveDPD before the switching calculated in the step 84 in FIG. 8 (=JudDPD−AveDPD) is calculated as a refrigerant pressure difference DDPD between before and after the switching of the opening/closing command, for determination use (step 102).

Next, it is determined in a step 103 whether or not the absolute value |DDPD| of the refrigerant pressure difference for determination use is not larger than a predetermined threshold value Thr1. If the answer to this question is negative (NO), i.e. if |DDPD|>Thr1 holds, which means that the difference in the refrigerant pressure PD between when the closing command was output to the grille shutter device 41 and when the opening command was output to the same, during the operation of the aircon 32, is large, it is judged that the grille shutter 47 was opened and closed according to the opening/closing command, so that it is determined that the grille shutter device 41 is normal, and to indicate this, in a step 104, a normal determination flag F_TempOK is set to "1".

On the other hand, if the answer to the question of the above step 103 is affirmative (YES), i.e. if |DDPD|≤Thr1 holds, which means that the difference in the refrigerant pressure PD between when the closing command was output to the grille shutter device 41 and when the opening command was output to the same, during the operation of the aircon 32, is small, it is judged that the grille shutter 47 was not opened and closed according to the opening/closing command, so that it is determined that the grille shutter device 41 is abnormal, and to indicate this, in a step 105, the normal determination flag F_TempOK is set to "0".

In a step 106 following the above step 104 or 105, to indicate that the above-described series of the first pre-switching process and the first post-switching process are terminated, the detection completion flag F_DONE is set to "1", followed by terminating the present process. When the detection completion flag F_DONE is thus set to "1", the answer to the question of the step 51 in FIG. 7 becomes affirmative (YES), and accordingly, in the step 63, the detection completion flag F_DONE is reset to "0", whereafter the first pre-switching process and the first post-switching process are repeatedly executed.

Referring again to FIG. 4, in a step 5 following the detection process in the step 4, it is determined whether or not the detection completion flag F_DONE is "1". If the answer to this question is negative (NO), the present process is terminated. On the other hand, if the answer to the question of the above step 5 is affirmative (YES), i.e. if it is immediately after the series of the first pre-switching process and the first post-switching process have been terminated, it is determined in a step 6 whether or not the normal determination flag F_TempOK is "1".

If the answer to this question is affirmative (YES), i.e. if it has been determined in the detection process that the grille shutter device 41 is normal, in a step 7, a counter value N is reset to 0, and further, it is finally determined that the grille shutter device 41 is normal and to indicate this, in a step 8 a failure final determination flag F_ERR is set to "0", followed by terminating the present process. Note that the counter value N is also reset to 0 when an ignition switch (not shown) is switched off.

On the other hand, if the answer to the question of the above step 6 is negative (NO), i.e. if it has been determined in the detection process that the grille shutter device 41 is abnormal, in a step 9, the counter value N is incremented, and it is determined in a step 10 whether or not the counter value N has reached a predetermined value NThr. If the answer to this question is negative (NO), the present process is immediately terminated. On the other hand, if the answer to the question of the step 10 is affirmative (YES), i.e. if the counter value N has reached the predetermined value NThr, the determination that the grille shutter device 41 is abnormal has been given by the detection process continuously a number of times equal in number to the predetermined value NThr, and hence it is finally determined that the grille shutter device 41 is in failure, and to indicate this, in a step 11, the failure final determination flag F_ERR is set to "1", followed by terminating the present process.

Figure 18:
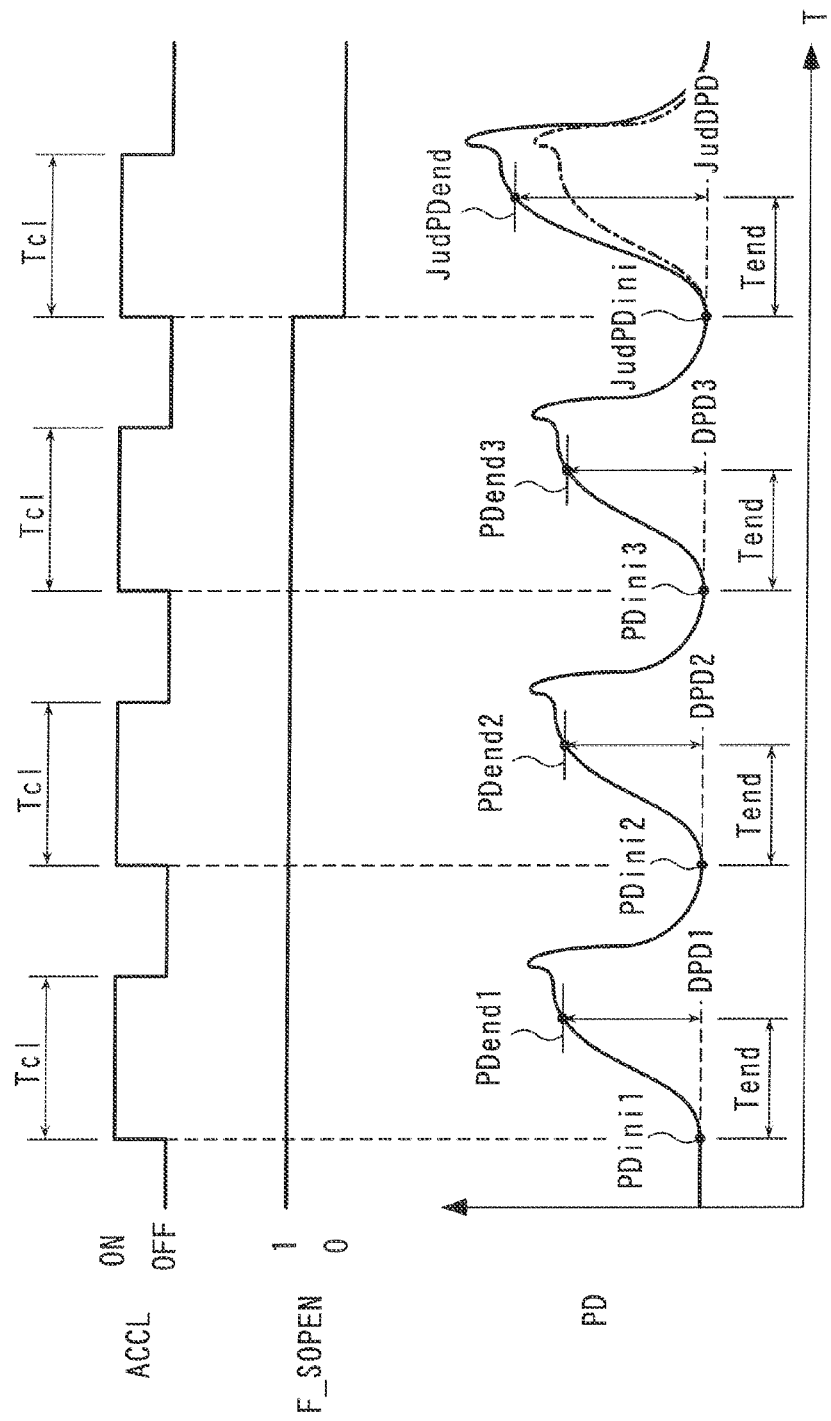
FIG. 18 A timing diagram showing an operation example obtained by the first pre-switching process and first post-switching process in a case where an opening/closing command is switched from an opening command to a closing command.

FIG. 18 is a timing diagram showing an operation example obtained by the above-described first pre-switching process and first post-switching process in the first detection process in a case where the opening/closing command to the grille shutter device 41 is switched from the opening command to the closing command. In this example, in the state in which the opening/closing command to the grille shutter device 41 is maintained to be the opening command, the engagement/disengagement of the aircon clutch 14 is repeated three times. Further, values of the refrigerant pressure PD detected immediately after the aircon clutch 14 has been engaged in respective times are stored as initial values PDini1 to PDini3 (step 74 in FIG. 8), and values of the refrigerant pressure PD detected when the predetermined time period Tend has elapsed from then are stored as end values PDend1 to PDend3. The respective differences between the end values PDend1 to PDend3 and the initial values PDini1 to PDini3 are calculated as refrigerant pressure differences DPD1 to DPD3 (step 80 in FIG. 8), and an average value of them, i.e. the refrigerant pressure average value AveDPD (=(DPD1+DPD2+DPD3)/3) is calculated.

Figure 9:
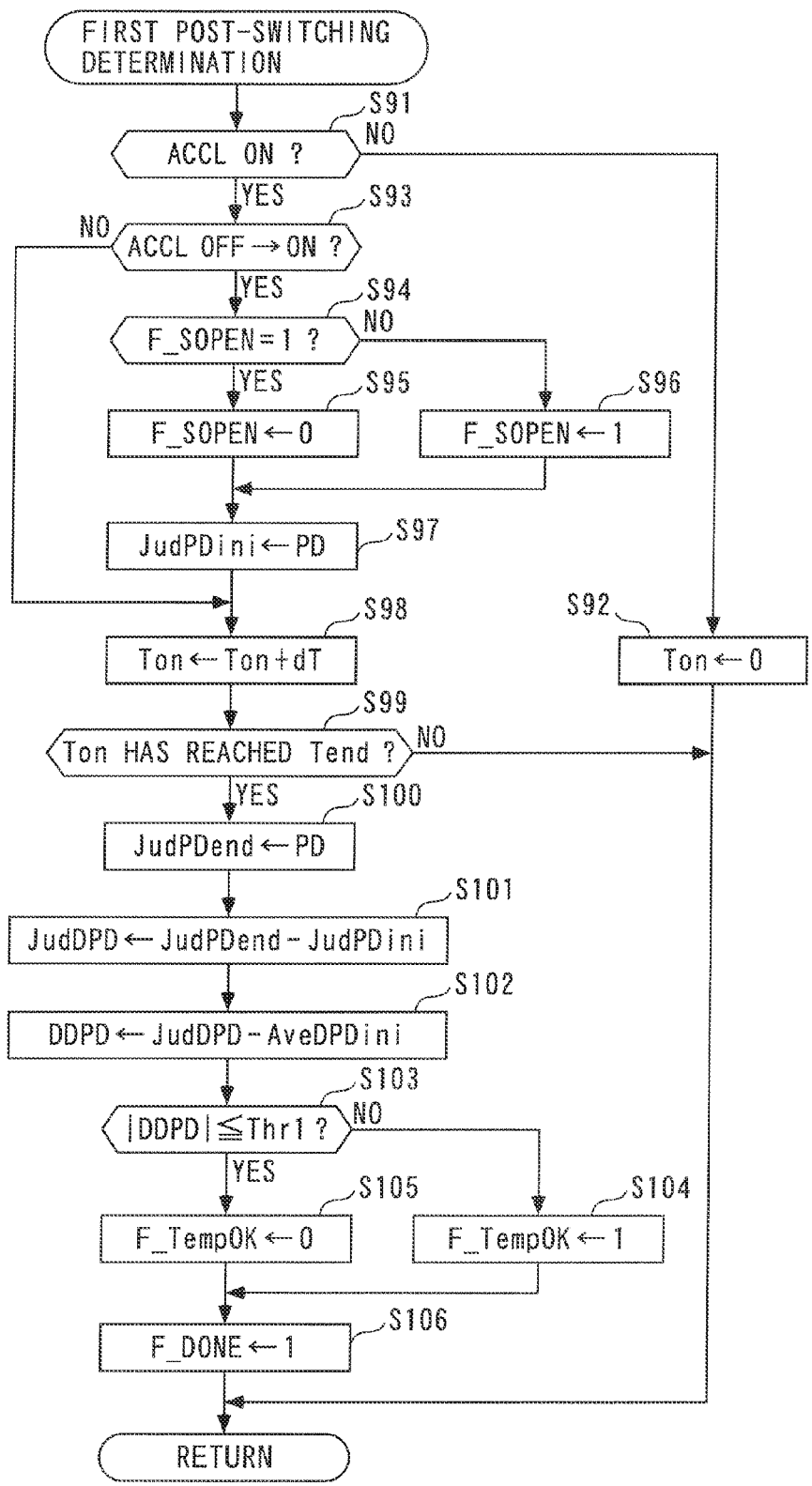
FIG. 9 A flowchart showing a first post-switching process.

Then, immediately after the aircon clutch 14 has been engaged for a fourth time, the opening/closing command to the grille shutter device 41 is switched from the opening command to the closing command (step 95 in FIG. 9), a value of the refrigerant pressure PD at the time is stored as the initial value JudPDini (step 97 in FIG. 9), and when the predetermined time period Tend has elapsed from then, the detected refrigerant pressure PD is stored as the end value JudPDend (step 100 in FIG. 9).

Further, the difference between these end value JudPDend and initial value JudPDini is calculated as the refrigerant pressure difference JudDPD (step 101 in FIG. 9), and the difference between the refrigerant pressure difference JudDPD and the refrigerant pressure average value AveDPD is calculated as the refrigerant pressure difference DDPD for determination use (step 102 in FIG. 9). Then, if the absolute value |DDPD| of the refrigerant pressure difference for determination use is not larger than a predetermined threshold value Thr1, it is determined that the grille shutter device 41 is abnormal (step 105 in FIG. 9).

Hereinafter, the second detection process executed in the step 44 in FIG. 6 when the aircon operation time period Tcl satisfies TCLR1≤Tcl<TCLR2 will be described with reference to FIGS. 10 to 13. In the present process, first, in steps 111 to 124 in FIG. 10, the processes similar to those in above-described steps 51 to 64 in FIG. 7 are executed. Then, if the answer to the question of the step 124 is negative (NO), i.e. if the counter value k has not reached the predetermined value C, in a step 125, a second pre-switching process is executed, and if the answer to the question of the above step 124 is affirmative (YES), i.e. if the counter value k has reached the predetermined value C, in a step 126, a second post-switching process is executed, followed by terminating the present process.

In the above-described first pre-switching process and first post-switching process in the first detection process, values of the refrigerant pressure PD detected when the predetermined time period Tend has elapsed after the aircon clutch 14 has been engaged are set as the end values PDend and JudPDend, respectively, however, in the second pre-switching process and second post-switching process, values of the refrigerant pressure PD detected when the predetermined time period Tend has elapsed after switching of the aircon clutch 14 to the engaged state and the refrigerant pressure PD reaching a peak are set as the end values PDend and JudPDend, respectively.

Figure 11:
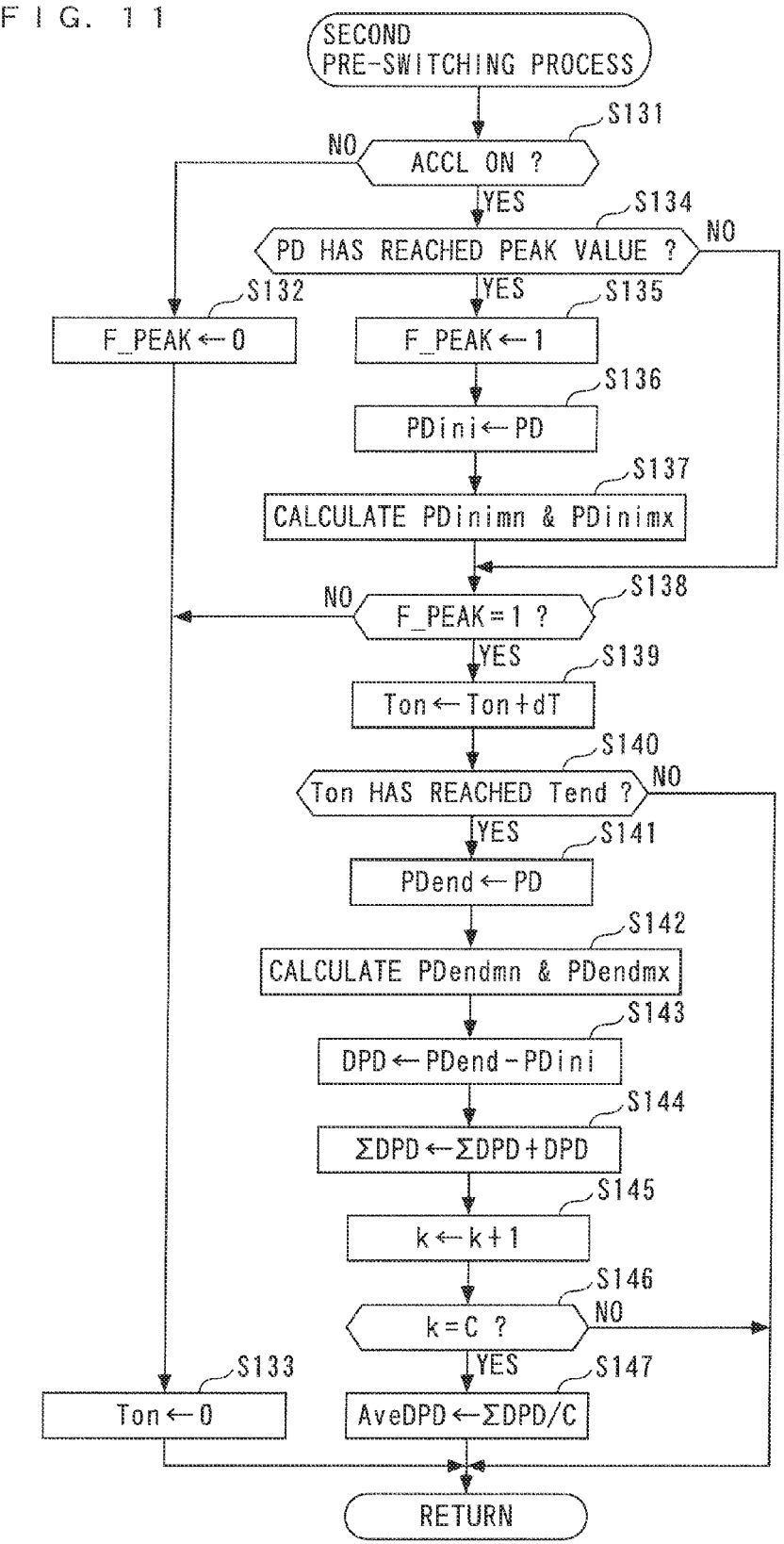
FIG. 11 A flowchart showing a second pre-switching process.

FIG. 11 shows a subroutine for the second pre-switching process. In the present process, first, it is determined in a step 131 whether or not the aircon clutch 14 has been engaged. If the answer to this question is negative (NO), a peak flag F_PEAK is reset to "0" (step 132), and the engagement time period Ton of the aircon clutch 14 is reset to 0 (step 133), followed by terminating the present process.

On the other hand, if the answer to the question of the above step 131 is affirmative (YES), it is determined in a step 134 whether or not the refrigerant pressure PD has reached a peak value between the preceding execution and the present execution of this step. This is determined, for example, by calculating an amount of change in the refrigerant pressure PD (the difference between the present value and the immediately preceding value of the refrigerant pressure PD) as occasion arises and determining whether or not the amount of change is changed from a positive value to a negative value. If the answer to the question of the step 134 is affirmative (YES), i.e. if it is immediately after the refrigerant pressure PD reached a peak value, the peak flag F_PEAK is set to "1" (step 135). Further, in a step 136, a value of the refrigerant pressure PD at the time is stored as the initial value PDini, in a step 137, the calculation process for calculating the minimum value PDinimn and the maximum value PDinimx of the initial value is executed, and then the process proceeds to a step 138. These minimum value PDinimn and maximum value PDinimx of the initial value are used for determining the stability of the initial value PDini in the step 114 in FIG. 10. On the other hand, if the answer to the question of the above step 134 is negative (NO), i.e. if it is not immediately after the refrigerant pressure PD has reached a peak value, the steps 135 to 137 are skipped and the process proceeds to the step 138.

In the step 138, it is determined whether or not the peak flag F_PEAK is "1". If the answer to this question is negative (NO), i.e. if the refrigerant pressure PD has not yet reached a peak value, the above-mentioned step 133 is executed, followed by terminating the present process. On the other hand, if the answer to the question of the above step 138 is affirmative (YES), i.e. the refrigerant pressure PD has already reached a peak value, in a step 139, the engagement time period Ton is calculated by adding the execution repetition period dT to the engagement time period Ton. Next, it is determined in a step 140 whether or not the engagement time period Ton has reached the predetermined time period Tend. If the answer to this question is negative (NO), the present process is terminated. On the other hand, if the answer to the question of the above step 140 is affirmative (YES), i.e. if it is immediately after the lapse of the predetermined time period Tend after the refrigerant pressure PD reached the peak value, in a step 141, a value of the refrigerant pressure PD at the time is stored as the end value PDend, and in a step 142, the calculation process for calculating the minimum value PDendmn and the maximum value PDendmx of the end value is executed. These minimum value PDendmn and maximum value PDendmx of the end value are used for determining the stability of the end value PDend in the step 115 in FIG. 10.

Next, in a step 143, the difference between this end value PDend and the initial value PDini stored in the step 136 (=PDend−PDini) is calculated as the refrigerant pressure difference DPD, and further, the refrigerant pressure integrated value ΣDPD is calculated by adding the refrigerant pressure difference DPD to the refrigerant pressure integrated value ΣDPD calculated up to the time (step 144).

Next, in a step 145, the counter value k is incremented, and it is determined in a step 146 whether or not the counter value k has reached the predetermined value C. If the answer to this question is negative (NO), the present process is immediately terminated. On the other hand, if the answer to the question of the step 146 is affirmative (YES), a value (=ΣDPD/C) obtained by dividing the refrigerant pressure integrated value ΣDPD by the predetermined value C is calculated as the refrigerant pressure average value AveDPD before the switching (step 147), followed by terminating the present process.

Figure 10:
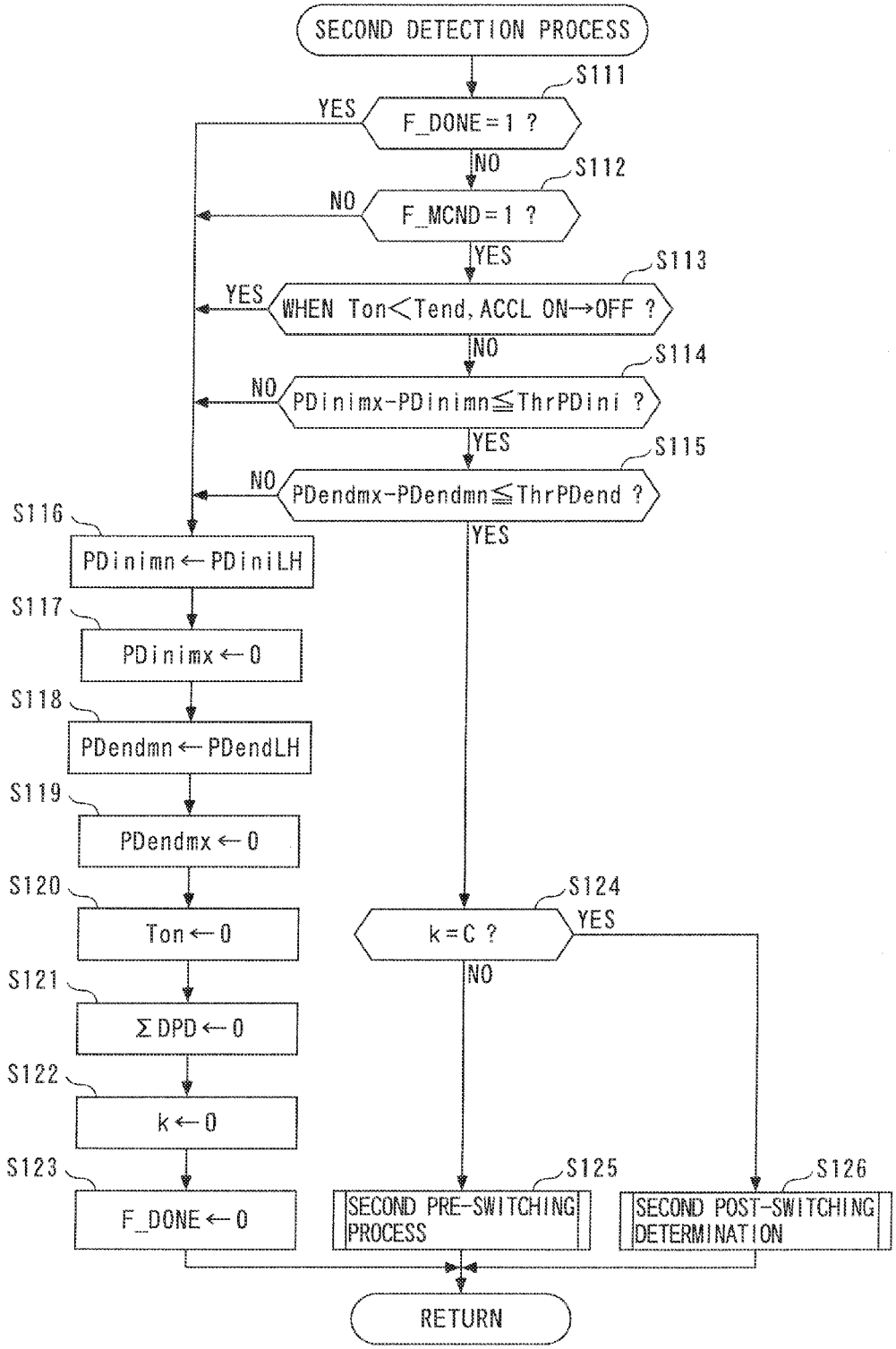
FIG. 10 A flowchart showing a second detection process.
Figure 12:
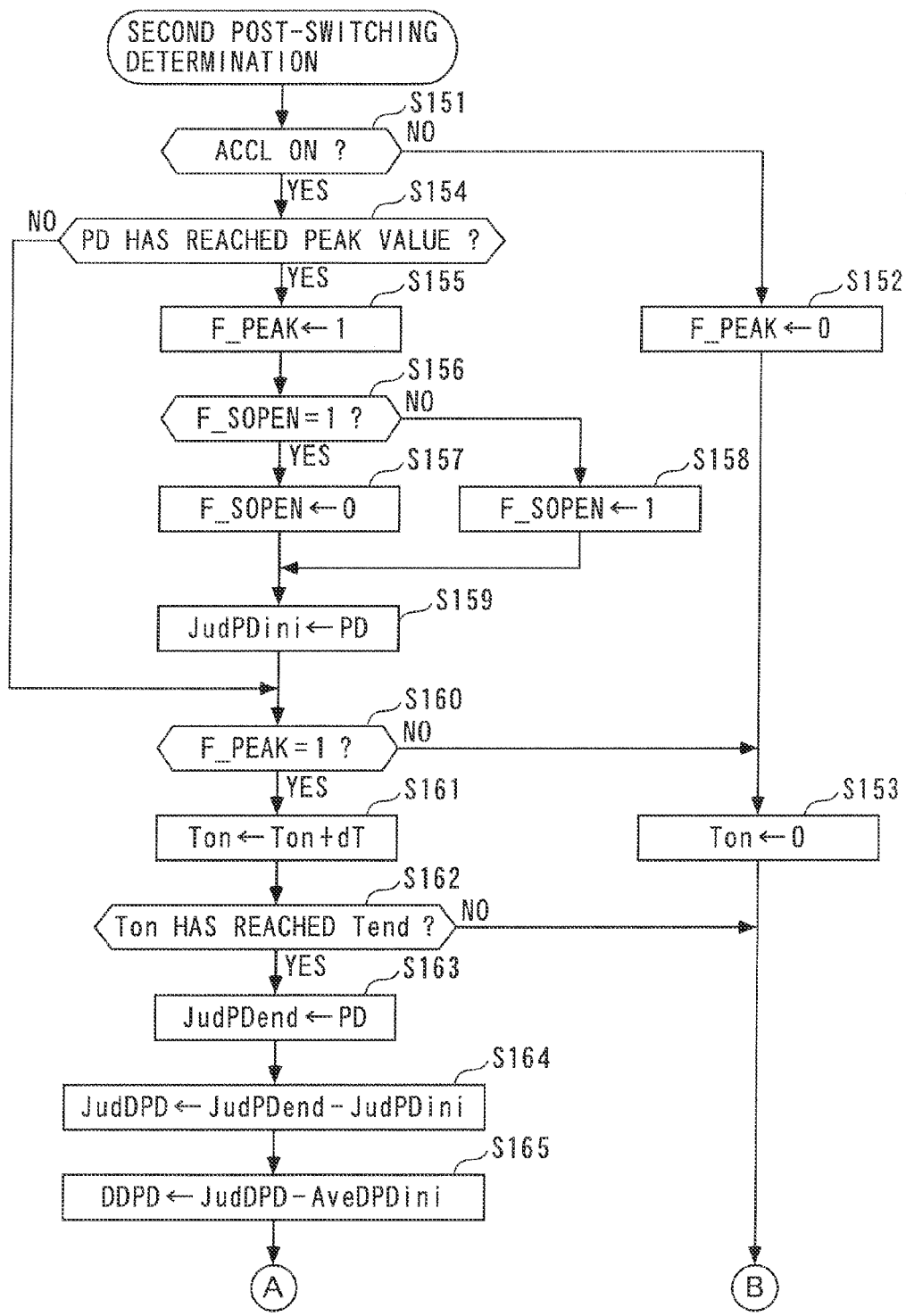
FIG. 12 A flowchart showing a second post-switching process.
Figure 13:
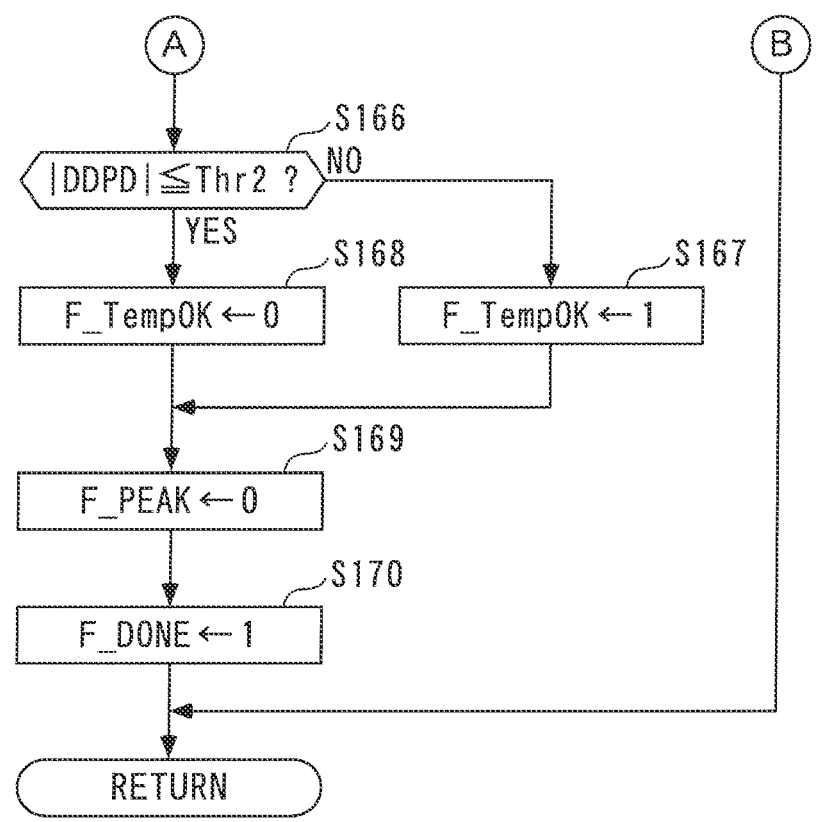
FIG. 13 A flowchart showing the remaining part of the second post-switching process of FIG. 12.

When the counter value k has reached the predetermined value C and the calculation of the refrigerant pressure average value AveDPD is completed, as described above, the answer to the question of the step 124 in FIG. 10 becomes affirmative (YES), and the second post-switching process is started. FIGS. 12 and 13 show a subroutine therefor. In the present process, first, it is determined in a step 151 whether or not the aircon clutch 14 has been engaged. If the answer to this question is negative (NO), in steps 152 and 153, the peak flag F_PEAK is reset to "0" and the engagement time period Ton of the aircon clutch 14 is reset to 0, respectively, followed by terminating the present process.

On the other hand, if the answer to the question of the above step 151 is affirmative (YES), it is determined in a step 154 whether or not the refrigerant pressure PD has reached a peak value between the preceding execution and the present execution of this step. If the answer to this question is affirmative (YES), i.e. if it is immediately after the refrigerant pressure PD has reached a peak value, the peak flag F_PEAK is set to "1" (step 155) and further, it is determined in a step 156 whether or not the opening command flag F_SOPEN is "1". If the answer to this question is affirmative (YES), i.e. if the opening command has been output to the grille shutter device 41 up to the time, in a step 157, by changing the opening command flag F_SOPEN to "0", the opening/closing command to the grille shutter device 41 is switched from the opening command to the closing command.

On the other hand, if the answer to the question of the step 156 is negative (NO), i.e. if the closing command has been output to the grille shutter device 41 up to the time, in a step 158, the opening/closing command to the grille shutter device 41 is switched from the closing command to the opening command by changing the opening command flag F_SOPEN to "1".

In a step 159 following the above step 157 or 158, a value of the refrigerant pressure PD at the time is stored as the initial value JudPDini and the process proceeds to a step 160. On the other hand, if the answer to the question of the above step 154 is negative (NO), i.e. if it is not immediately after the refrigerant pressure PD has reached a peak value, the above steps 155 to 159 are skipped and the process proceeds to the step 160.

In the step 160, it is determined whether or not the peak flag F_PEAK is "1". If the answer to this question is negative (NO), i.e. if the refrigerant pressure PD has not yet reached a peak value, by executing the above-mentioned step 153, the engagement time period Ton is reset to 0, followed by terminating the present process. On the other hand, if the answer to the question of the above step 160 is affirmative (YES), i.e. if the refrigerant pressure PD has already reached a peak value, in a step 161, the engagement time period Ton is calculated by adding the execution repetition period dT to the engagement time period Ton.

Next, it is determined in a step 162 whether or not the engagement time period Ton has reached the predetermined time period Tend. If the answer to this question is negative (NO), the present process is terminated. On the other hand, if the answer to the question of the above step 162 is affirmative (YES), i.e. if it is immediately after the lapse of the predetermined time period Tend after the refrigerant pressure PD reached the peak value, in a step 163, a value of the refrigerant pressure PD at the time is stored as the end value JudPDend.

Next, in a step 164, the difference between this end value JudPDend and the initial value JudPDini stored in the step 159 (=JudPDend−JudPDini) is calculated as the refrigerant pressure difference JudDPD, and further, the difference between the calculated refrigerant pressure difference JudDPD and the refrigerant pressure average value AveDPD before the switching calculated in the step 147 in FIG. 11 (=JudDPD−AveDPD) is calculated as the refrigerant pressure difference DDPD between before and after the switching of the opening/closing command, for determination use (step 165).

Next, it is determined in a step 166 whether or not the absolute value |DDPD| of the refrigerant pressure difference for determination use is not larger than a predetermined threshold value Thr2. If the answer to this question is negative (NO), i.e. if |DDPD|>Thr2 holds, which means that the difference in the refrigerant pressure PD between when the closing command was output to the grille shutter device 41 and when the opening command was output to the same, during the operation of the aircon 32, is large, it is judged that the grille shutter 47 was opened and closed according to the opening/closing command, so that it is determined that the grille shutter device 41 is normal, and to indicate this, in a step 167, the normal determination flag F_TempOK is set to "1".

On the other hand, if the answer to the question of the above step 166 is affirmative (YES), i.e. if |DDPD|≤Thr2 holds, which means that the difference in the refrigerant pressure PD between when the closing command was output to the grille shutter device 41 and when the opening command was output to the same, during the operation of the aircon 32, is small, it is judged that the grille shutter 47 was not opened and closed according to the opening/closing command, so that it is determined that the grille shutter device 41 is abnormal, and to indicate this, in a step 168, the normal determination flag F_TempOK is set to "0".

In a step 169 following the above step 167 or 168, the peak flag F_PEAK is reset to "0". Further, in a step 170, to indicate that the above-described series of second pre-switching process and second post-switching process are terminated, the detection completion flag F_DONE is set to "1", followed by terminating the present process. When the detection completion flag F_DONE is thus set to "1", the answer to the question of the step 111 in FIG. 10 becomes affirmative (YES), and accordingly, in the step 123, the detection completion flag F_DONE is reset to "0", whereafter the second pre-switching process and the second post-switching process are repeated.

Figure 19:
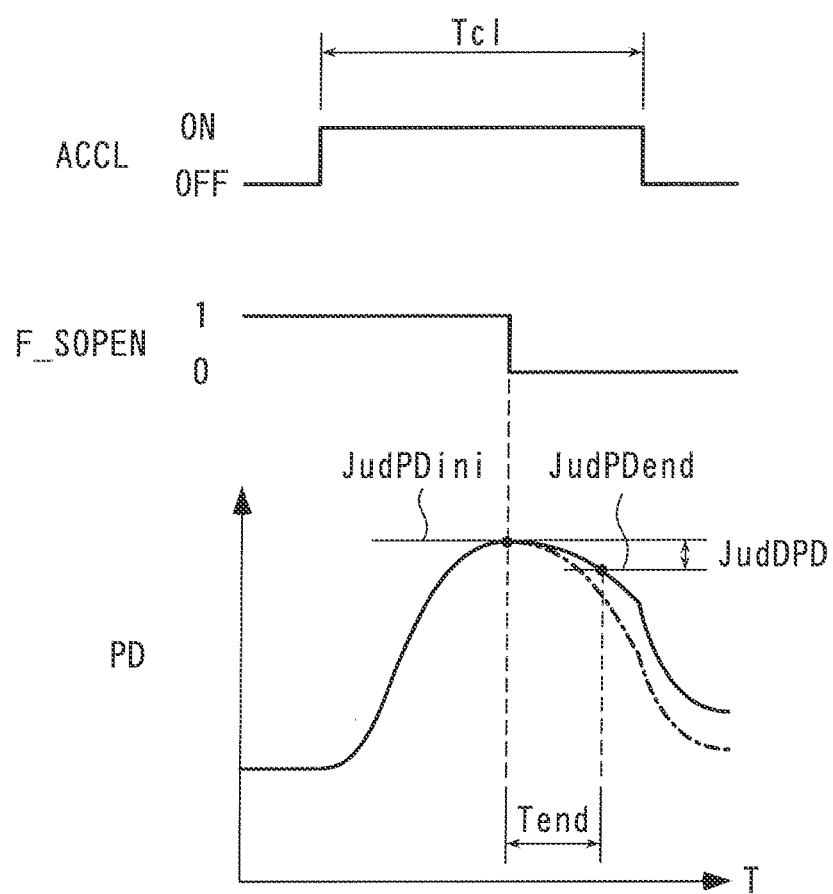
FIG. 19 A timing diagram showing an operation example obtained by the second post-switching process in a case where the opening/closing command is switched from the opening command to the closing command.

FIG. 19 is a timing diagram showing an operation example obtained by the above-described second post-switching process in the second detection process in a case where the opening/closing command to the grille shutter device 41 is switched from the opening command to the closing command. In this example, when the refrigerant pressure PD reaches a peak value, the opening/closing command is switched from the opening command to the closing command (step 157 in FIG. 12), and a value of the refrigerant pressure PD at the time is stored as the initial value JudPDini (step 159 in FIG. 12). Subsequently, the refrigerant pressure PD at the time of the lapse of the predetermined time period Tend is stored as the end value JudPDend (step 163 in FIG. 12), and the difference between this end value JudPDend and the initial value JudPDini is calculated as the refrigerant pressure difference JudDPD (step 164 in FIG. 12).

Further, although not shown, in the second pre-switching process executed in advance of the second post-switching process, when the engagement/disengagement of the aircon clutch 14 is repeated in a state in which the opening/closing command is maintained to be the opening command, three values of the refrigerant pressure PD each detected at the time of the lapse of the predetermined time period Tend after the refrigerant pressure PD reaching the peak value are used as the end values PDend1 to PDend3 in the second pre-switching process, whereby the refrigerant pressure average value AveDPD is calculated (step 147 in FIG. 11).

Further, the difference between the refrigerant pressure difference JudDPD calculated after the switching and the refrigerant pressure average value AveDPD calculated before the switching is calculated as the refrigerant pressure difference DDPD for determination use (step 165 in FIG. 12). Then, if the absolute value |DDPD| of the refrigerant pressure difference for determination use is not larger than the predetermined threshold value Thr2, it is determined that the grille shutter device 41 is abnormal (step 168 in FIG. 13).

Hereafter, the third detection process executed in the step 45 in FIG. 6 when the aircon operation time period Tcl satisfies Tcl≥TCLR2 will be described with reference to FIGS. 14 to 17. In the present process, first, in steps 181 to 194 in FIG. 14, the processes similar to those in above-described steps 51 to 64 in FIG. 7 are executed, and if the answer to the question of the step 194 is negative (NO), in a step 195, a third pre-switching process is executed, whereas if the answer to the question of the above step 194 is affirmative (YES), in a step 196, a third post-switching process is executed, followed by terminating the present process.

In the above-described first pre-switching process and first post-switching process, respective values of the refrigerant pressure PD detected at the time of the lapse of the predetermined time period Tend after the aircon clutch 14 being switched to the engaged state are set as the end values PDend and JudPDend, and in the second pre-switching process and second post-switching process, respective values of the refrigerant pressure PD detected at the time of the lapse of the predetermined time period Tend after the refrigerant pressure PD reaching a peak after switching of the aircon clutch 14 to the engaged state are set as the end values PDend and JudPDend. In contrast, in the third pre-switching process and third post-switching process, values of the refrigerant pressure PD detected at the time of the lapse of the predetermined time period Tend after the refrigerant pressure PD having converged after switching of the aircon clutch 14 to the engaged state are set as the end values PDend and JudPDend.

Figure 15:
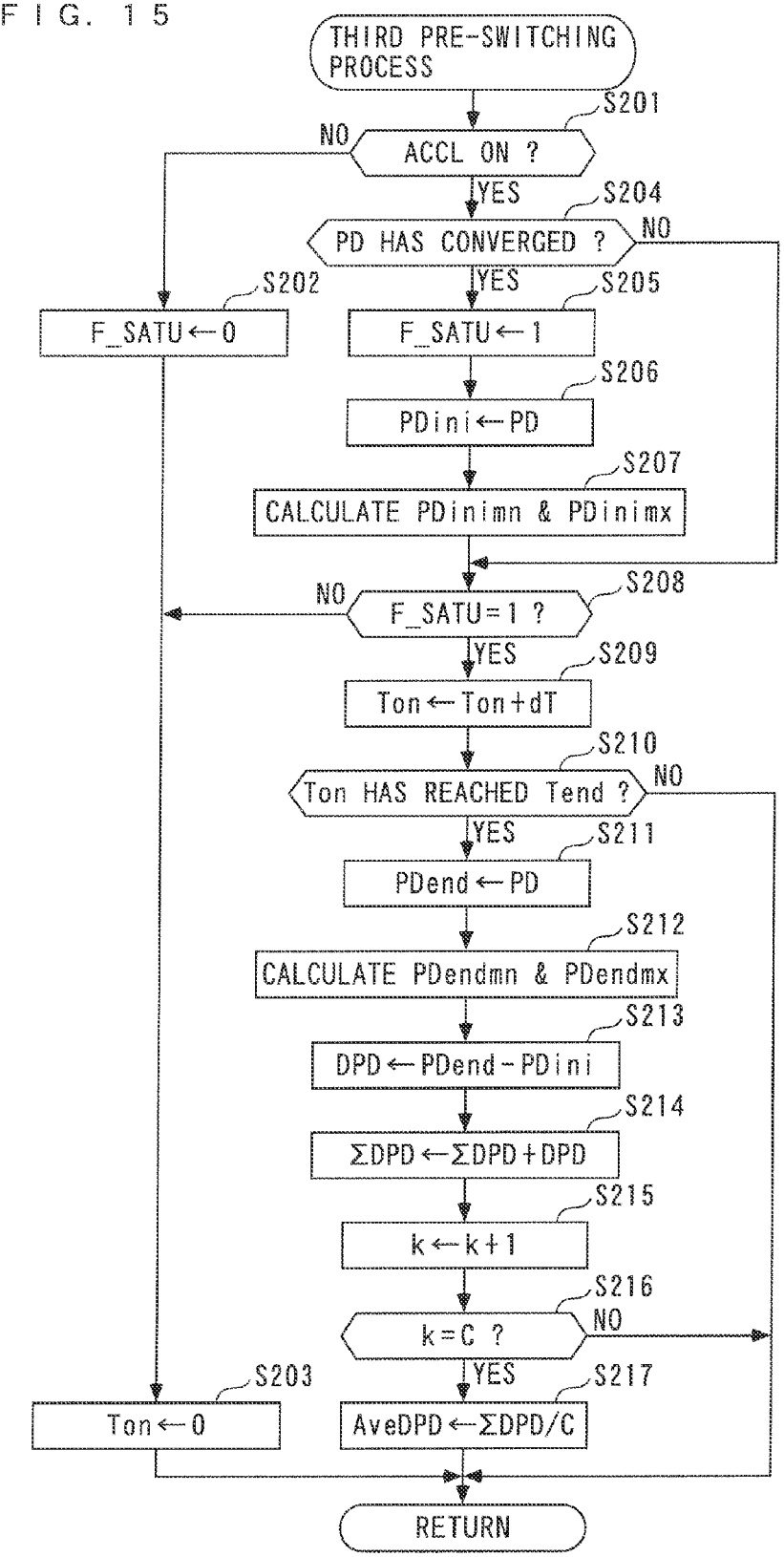
FIG. 15 A flowchart showing a third pre-switching process.

FIG. 15 shows a subroutine for the third pre-switching process. In the present process, first, it is determined in a step 201 whether or not the aircon clutch 14 has been engaged. If the answer to this question is negative (NO), a convergence flag F_SATU is reset to "0" (step 202), and the engagement time period Ton of the aircon clutch 14 is reset to 0 (step 203), followed by terminating the present process.

On the other hand, if the answer to the question of the above step 201 is affirmative (YES), it is determined in a step 204 whether or not the refrigerant pressure PD has converged between the preceding execution and the present execution of this step. This is determined, for example, by calculating an amount of change in the refrigerant pressure PD (the difference between the present value and the immediately preceding value of the refrigerant pressure PD) as occasion arises and determining whether or not a state in which the absolute value of the amount of change is smaller than a predetermined value continues for a predetermined time period. If the answer to the question of the step 204 is affirmative (YES), i.e. if it is immediately after convergence of the refrigerant pressure PD, the convergence flag F_SATU is set to "1" (step 205), and further, in a step 206, a value of the refrigerant pressure PD at the time is stored as the initial value PDini, and in a step 207, the calculation process for calculating the minimum value PDinimn and the maximum value PDinimx of the initial value is executed, and the process proceeds to a step 208. These minimum value PDinimn and maximum value PDinimx of the initial value are used for determining the stability of the initial value PDini in the step 184 in FIG. 14. On the other hand, if the answer to the question of the step 204 is negative (NO), i.e. if it is not immediately after convergence of the refrigerant pressure PD, the steps 205 to 207 are skipped and the process proceeds to the step 208.

In the step 208, it is determined whether or not the convergence flag F_SATU is "1". If the answer to this question is negative (NO), i.e. if the refrigerant pressure PD has not converged yet, the above-described step 203 is executed, followed by terminating the present process. On the other hand, if the answer to the question of the step 208 is affirmative (YES), i.e. the refrigerant pressure PD has already converged, in a step 209, the engagement time period Ton is calculated by adding the execution repetition period dT to the engagement time period Ton. Next, it is determined in a step 210 whether or not the engagement time period Ton has reached the predetermined time period Tend. If the answer to this question is negative (NO), the present process is terminated. On the other hand, if the answer to the question of the above step 210 is affirmative (YES), i.e. if it is immediately after the lapse of the predetermined time period Tend after convergence of the refrigerant pressure PD, in a step 211, a value of the refrigerant pressure PD at the time is stored as the end value PDend, and in a step 212, the calculation process for calculating the minimum value PDendmn and the maximum value PDendmx of the end value is executed. These minimum value PDendmn and maximum value PDendmx of the end value are used for determining the stability of the end value PDend in the step 185 in FIG. 14.

Next, in a step 213, the difference between this end value PDend and the initial value PDini stored in the step 206 (=PDend−PDini) is calculated as the refrigerant pressure difference DPD, and further, the refrigerant pressure integrated value ΣDPD is calculated by adding the refrigerant pressure difference DPD to the refrigerant pressure integrated value ΣDPD calculated up to the time (step 214).

Next, in a step 215, the counter value k is incremented, and it is determined in a step 216 whether or not the counter value k has reached the predetermined value C. If the answer to this question is negative (NO), the present process is immediately terminated. On the other hand, if the answer to the question of the step 216 is affirmative (YES), a value (=ΣDPD/C) obtained by dividing the refrigerant pressure integrated value ΣDPD by the predetermined value C is calculated as the refrigerant pressure average value AveDPD before the switching (step 217), followed by terminating the present process.

Figure 14:
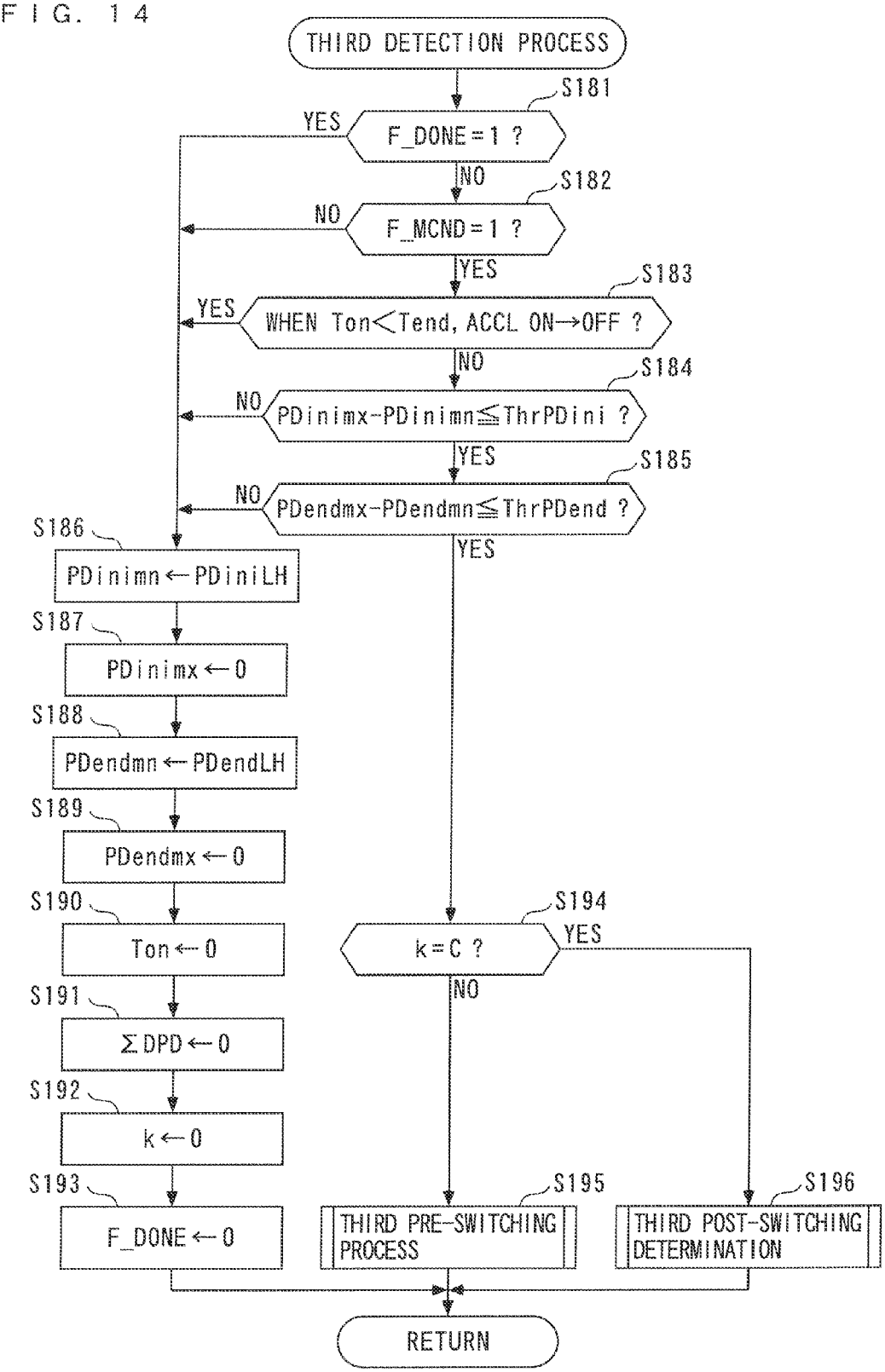
FIG. 14 A flowchart showing a third detection process.
Figure 16:
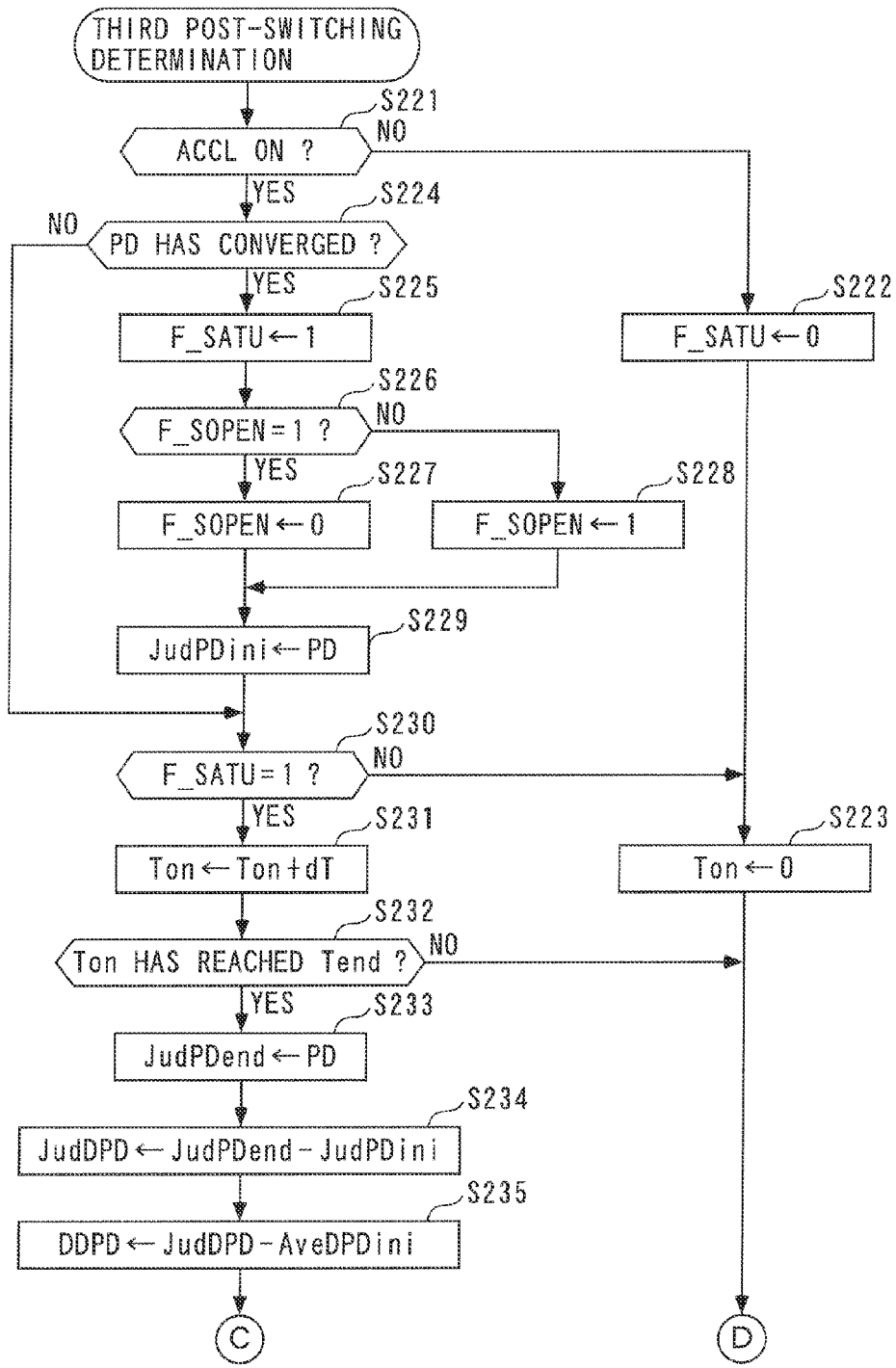
FIG. 16 A flowchart showing a third post-switching process.
Figure 17:
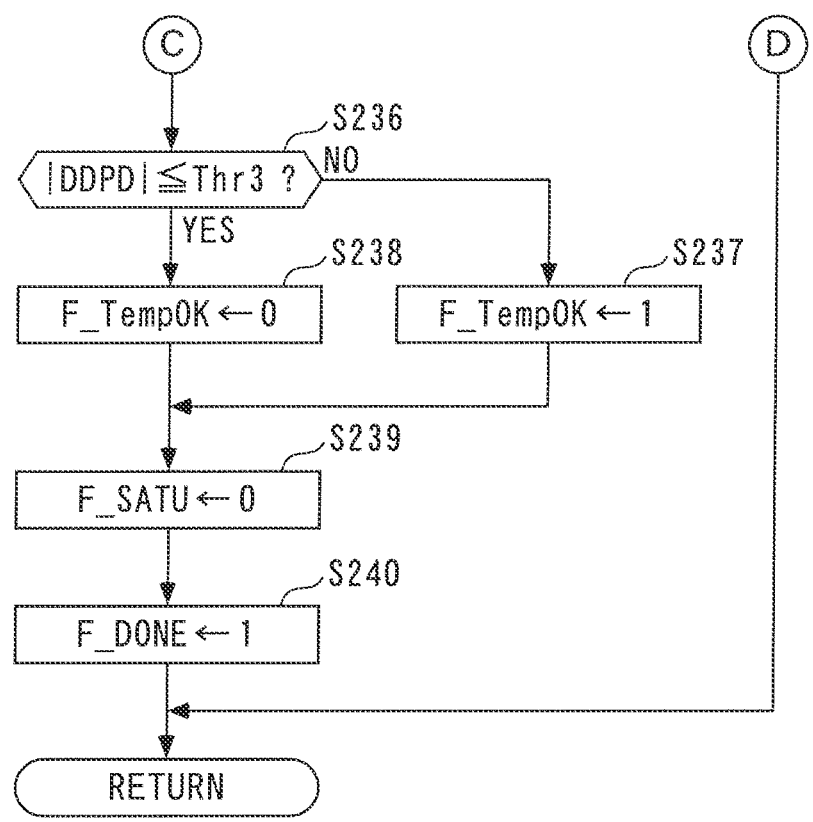
FIG. 17 A flowchart showing the remaining part of the third post-switching process of FIG. 16.

When the counter value k has reached the predetermined value C and the calculation of the refrigerant pressure average value AveDPD is completed, as described above, the answer to the question of the step 194 in FIG. 14 becomes affirmative (YES), and the third post-switching process is started. FIGS. 16 and 17 show subroutines therefor. In the present process, first, it is determined in a step 221 whether or not the aircon clutch 14 has been engaged. If the answer to this question is negative (NO), in steps 222 and 223, the convergence flag F_SATU is reset to "0" and the engagement time period Ton of the aircon clutch 14 is reset to 0, respectively, followed by terminating the present process.

On the other hand, if the answer to the question of the above step 221 is affirmative (YES), it is determined in a step 224 whether or not the refrigerant pressure PD has converged between the preceding execution and the present execution of this step. If the answer to this question is affirmative (YES), i.e. if it is immediately after convergence of the refrigerant pressure PD, the convergence flag F_SATU is set to "1" (step 225) and further, it is determined in a step 226 whether or not the opening command flag F_SOPEN is "1". If the answer to this question is affirmative (YES), i.e. if the opening command has been output to the grille shutter device 41 up to the time, in a step 227, the opening command flag F_SOPEN is changed to "0". This causes the opening/closing command to the grille shutter device 41 to be switched from the opening command to the closing command.

On the other hand, if the answer to the question of the step 226 is negative (NO), i.e. if the closing command has been output to the grille shutter device 41 up to the time, in a step 228, by changing the opening command flag F_SOPEN to "1", the opening/closing command to the grille shutter device 41 is switched from the closing command to the opening command.

In a step 229 following the above step 227 or 228, a value of the refrigerant pressure PD at the time is stored as the initial value JudPDini and the process proceeds to a step 230. On the other hand, if the answer to the question of the above step 224 is negative (NO), i.e. if it is not immediately after convergence of the refrigerant pressure PD, the steps 225 to 229 are skipped and the process proceeds to the step 230.

In the step 230, it is determined whether or not the convergence flag F_SATU is "1". If the answer to this question is negative (NO), i.e. if the refrigerant pressure PD has not converged yet, by executing the above-mentioned step 223, the engagement time period Ton is reset to 0, followed by terminating the present process. On the other hand, if the answer to the question of the above step 230 is affirmative (YES), i.e. if the refrigerant pressure PD has already converged, in a step 231, the engagement time period Ton is calculated by adding the execution repetition period dT to the engagement time period Ton.

Next, it is determined in a step 232 whether or not the engagement time period Ton has reached the predetermined time period Tend. If the answer to this question is negative (NO), the present process is terminated. On the other hand, if the answer to the question of the above step 232 is affirmative (YES), i.e. if it is immediately after the lapse of the predetermined time period Tend after convergence of the refrigerant pressure PD, in a step 233, the refrigerant pressure PD at the time is stored as the end value JudPDend.

Next, in a step 234, the difference between this end value JudPDend and the initial value JudPDini stored in the step 229 (=JudPDend−JudPDini) is calculated as the refrigerant pressure difference JudDPD, and further, the difference between the calculated refrigerant pressure difference JudDPD and the refrigerant pressure average value AveDPD before the switching calculated in the step 217 in FIG. 15 (=JudDPD−AveDPD) is calculated as the refrigerant pressure difference DDPD between before and after the switching of the opening/closing command, for determination use (step 235).

Next, it is determined in a step 236 whether or not the absolute value |DDPD| of the refrigerant pressure difference for determination use is not larger than a predetermined threshold value Thr3. If the answer to this question is negative (NO), i.e. if |DDPD|>Thr3 holds, which means that the difference in the refrigerant pressure PD between when the closing command was output to the grille shutter device 41 and when the opening command was output to the same, during the operation of the aircon 32, is large, it is judged that the grille shutter 47 was opened and closed according to the opening/closing command, so that it is determined that the grille shutter device 41 is normal, and to indicate this, in a step 237, the normal determination flag F_TempOK is set to "1".

On the other hand, if the answer to the question of the above step 236 is affirmative (YES), i.e. if |DDPD|≤Thr3 holds, which means that the difference in the refrigerant pressure PD between when the closing command was output to the grille shutter device 41 and when the opening command was output to the same, during the operation of the aircon 32, is small, it is judged that the grille shutter 47 was not opened and closed according to the opening/closing command, so that it is determined that the grille shutter device 41 is abnormal, and to indicate this, in a step 238, the normal determination flag F_TempOK is set to "0".

In a step 239 following the above step 237 or 238, the convergence flag F_SATU is reset to "0". Further, in a step 240, to indicate that the above-described series of third pre-switching process and third post-switching process are terminated, the detection completion flag F_DONE is set to "1", followed by terminating the present process. When the detection completion flag F_DONE is thus set to "1", the answer to the question of the step 181 in FIG. 14 becomes affirmative (YES), and accordingly, in the step 193, the detection completion flag F_DONE is reset to "0", whereafter the third pre-switching process and the third post-switching process are repeated.

Figure 20:
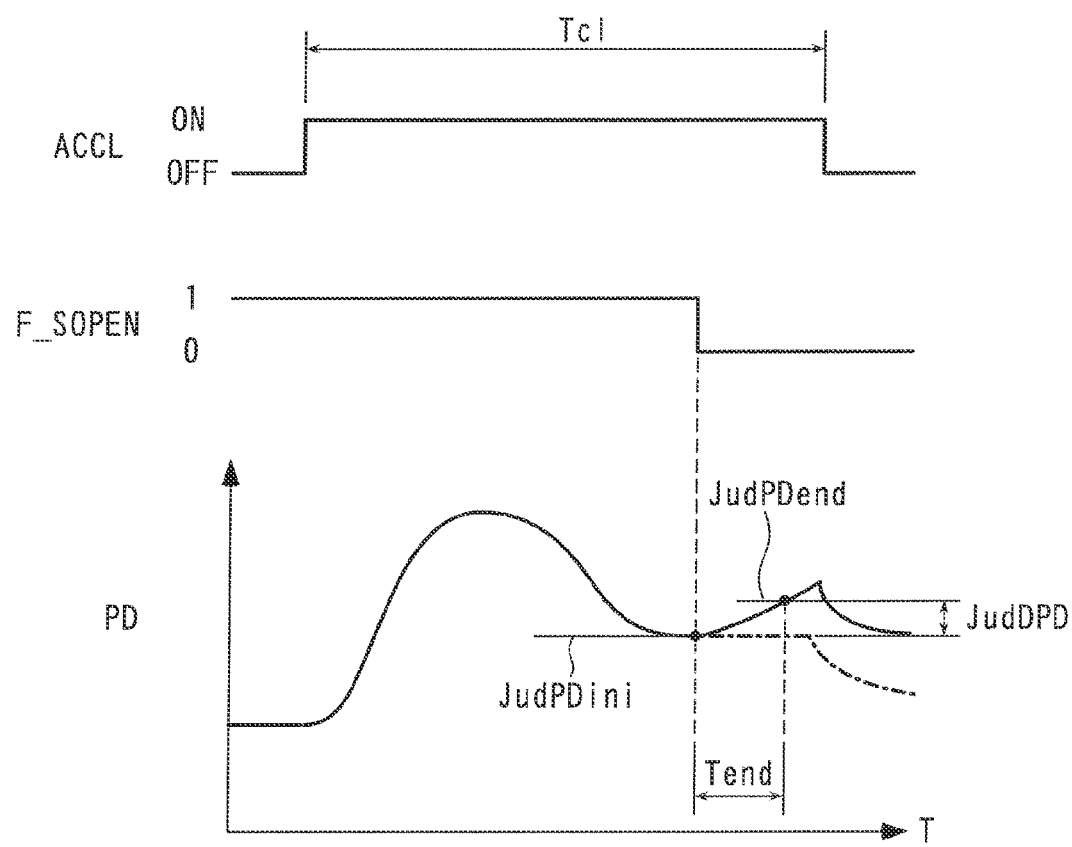
FIG. 20 A timing diagram showing an operation example obtained by the third post-switching process in a case where the opening/closing command is switched from the opening command to the closing command.

FIG. 20 is a timing diagram showing an operation example obtained by the above-described third post-switching process in the third detection process in a case where the opening/ closing command to the grille shutter device 41 is switched from the opening command to the closing command. In this example, when the refrigerant pressure PD has converged, the opening/closing command is switched from the opening command to the closing command (step 227 in FIG. 16), and a value of the refrigerant pressure PD at the time is stored as the initial value JudPDini (step 229 in FIG. 16). Subsequently, a value of the refrigerant pressure PD at the time of the lapse of the predetermined time period Tend is stored as the end value JudPDend (step 233 in FIG. 16), and the difference between this end value JudPDend and the initial value JudPDini is calculated as the refrigerant pressure difference JudDPD (step 234 in FIG. 16).

Further, although not shown, in the third pre-switching process executed in advance of the third post-switching process, when the engagement/disengagement of the aircon clutch 14 is repeated in a state in which the opening/closing command is maintained to be the opening command, three values of the refrigerant pressure PD each detected at the time of the lapse of the predetermined time period Tend after convergence of the refrigerant pressure PD are used as the end values PDend1 to PDend3 in the third pre-switching process, whereby the refrigerant pressure average value AveDPD is calculated (step 217 in FIG. 15).

Further, the difference between the refrigerant pressure difference JudDPD calculated after the switching and the refrigerant pressure average value AveDPD calculated before the switching is calculated as the refrigerant pressure difference DDPD for determination use (step 235 in FIG. 16). Then, if the absolute value |DDPD| of the refrigerant pressure difference for determination use is not larger than the predetermined threshold value Thr3, it is determined that the grille shutter device 41 is abnormal (step 238 in FIG. 17).

As described above, according to the present embodiment, a failure of the grille shutter device 41 is determined based on the refrigerant pressure PD which changes at a large rate according to the opening/closing of the grille shutter 47 (steps 4, 11 in FIG. 4), and hence it is possible to determine a failure with accuracy in a short time period. For the same reason, it is possible to secure the accuracy of failure determination, without using a high-accuracy sensor as the refrigerant pressure sensor 21 for detecting the refrigerant pressure PD, and hence it is possible to reduce costs.

Further, a failure of the grille shutter device 41 is determined based on the refrigerant pressure difference DDPD between before and after the switching of the opening/closing command (=JudDPD−AveDPD) for determination use, during the operation of the aircon 32, and hence it is possible to properly determine the failure. In this case, the failure of the grille shutter device 41 indicates that the grille shutter 47 is not opened and closed normally according to the opening/closing command, and hence this failure includes, in addition to the sticking of the grille shutter 47 itself, disconnection of a command line from the ECU 2 to the motor 31, a failure of the motor 31 itself, a failure of the arm link 54 and the slide link 48 which connect between the motor 31 and the grille shutter 47, and so forth.

Further, when the absolute value |DDPD| of the refrigerant pressure difference for determination use is not larger than a predetermined threshold value Thr, it is determined that a failure has occurred in the grille shutter device 41 (step 105 in FIG. 9, step 168 in FIG. 13, and step 238 in FIG. 17), and hence it is possible to properly determine a failure of the grille shutter 47 in both of a case where the opening/closing command is switched from the opening command to the closing command and a case where the same is switched from the closing command to the opening command.

Further, using a timing at which the opening/closing command is switched as a reference timing, a value of the refrigerant pressure PD detected at the time of the lapse of the predetermined time period Tend from the reference timing is set as the end value PDend and is used for determining failure of the grille shutter device 41. This makes it possible to make uniform the sampling conditions of the refrigerant pressure PD for use in failure determination, whereby it is possible to more properly determine a failure of the grille shutter device 41.

Further, in the first post-switching process in the first detection process, a timing at which the aircon clutch 14 is engaged is used as the reference timing, and at this reference timing, the opening/closing command is switched (steps 93 to 96 in FIG. 9). This makes it possible to switch the opening/closing command in a state in which the refrigerant pressure PD is actually increasing, whereby it is possible to properly determine a failure of the grille shutter device 41.

Further, in the second post-switching process, a timing at which the refrigerant pressure PD has reached the peak value after the aircon clutch 14 has been engaged is used as the reference timing, and at this reference timing, the opening/closing command is switched (steps 154 to 158 in FIG. 12). Therefore, compared with the case of the third post-switching process in which the timing at which the refrigerant pressure PD has converged is used as the reference timing, it is possible to determine a failure of the grille shutter device 41 earlier in a short time period.

Further, in the third post-switching process, a timing at which the refrigerant pressure PD has converged after the aircon clutch 14 has been engaged is used as the reference timing, and at this reference timing, the opening/closing command is switched (steps 224 to 228 in FIG. 16). Therefore, by switching the opening/closing command when the refrigerant pressure PD is in a stable state, it is possible to exclude the influence of fluctuation of the refrigerant pressure PD, whereby it is possible to further enhance the accuracy of failure determination of the grille shutter device 41.

Further, when the aircon operation time period Tcl is shorter than the first predetermined time period TCLR1, the first detection process is selected; when the same is not shorter than the first predetermined time period TCLR1 but shorter than the second predetermined time period TCLR2, the second detection process is selected; and when the same is not shorter than the second predetermined time period TCLR2, the third detection process is selected (FIG. 6). Therefore, it is possible to switch the opening/closing command at the most appropriate timing according to the aircon operation time period Tcl and to properly determine a failure of the grille shutter device 41.

Figure 7:
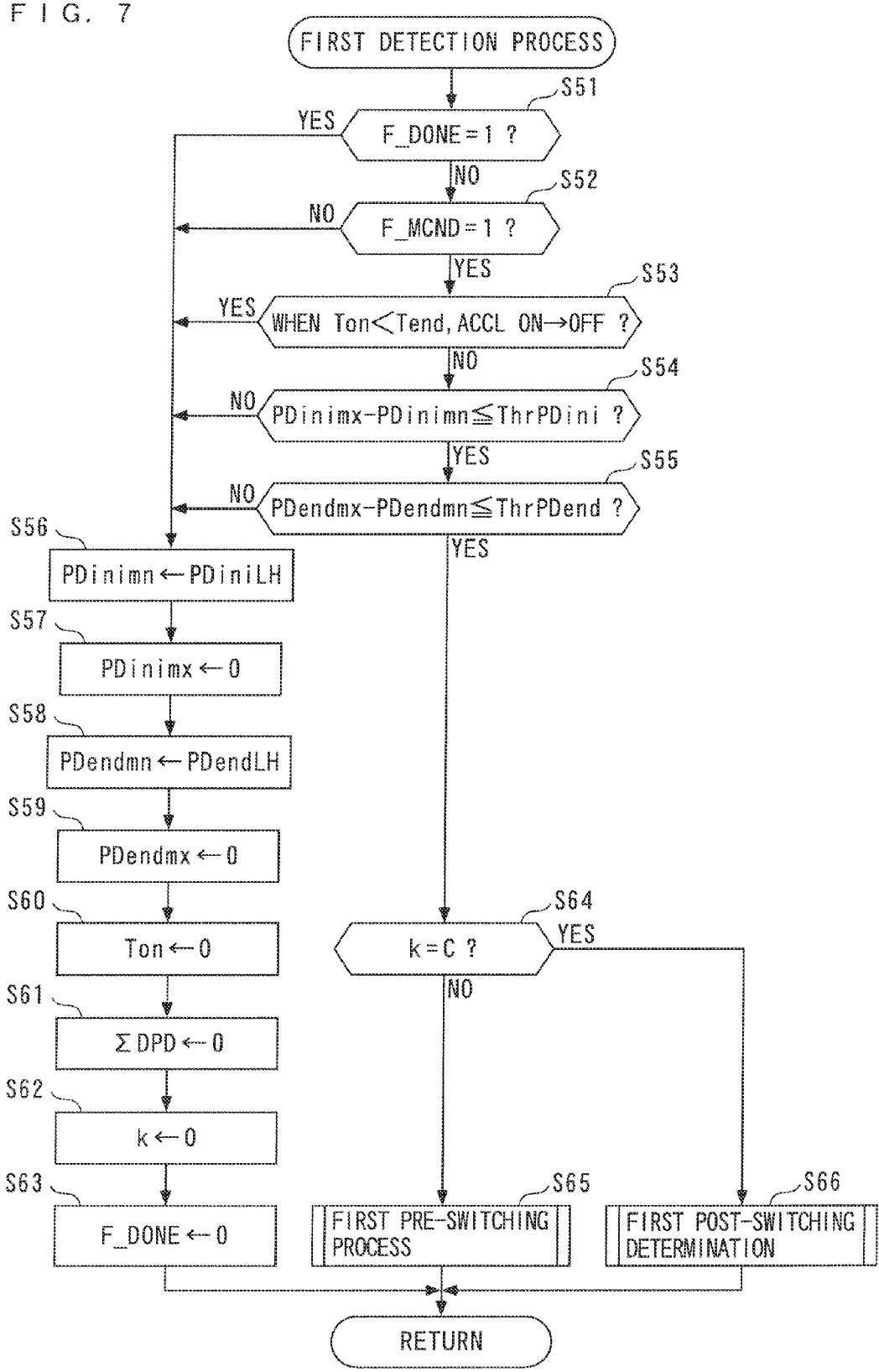
FIG. 7 A flowchart showing a first detection process.

Further, in a case where the temperature setting of the aircon is changed or inside air circulation/outside air introduction is switched, failure determination of the grille shutter device 41 is inhibited (steps 26, 27, 34 in FIG. 5, and step 52 in FIG. 7). This makes it possible to positively avoid a determination error caused by a change in the operation conditions of the aircon.

Figure 21:
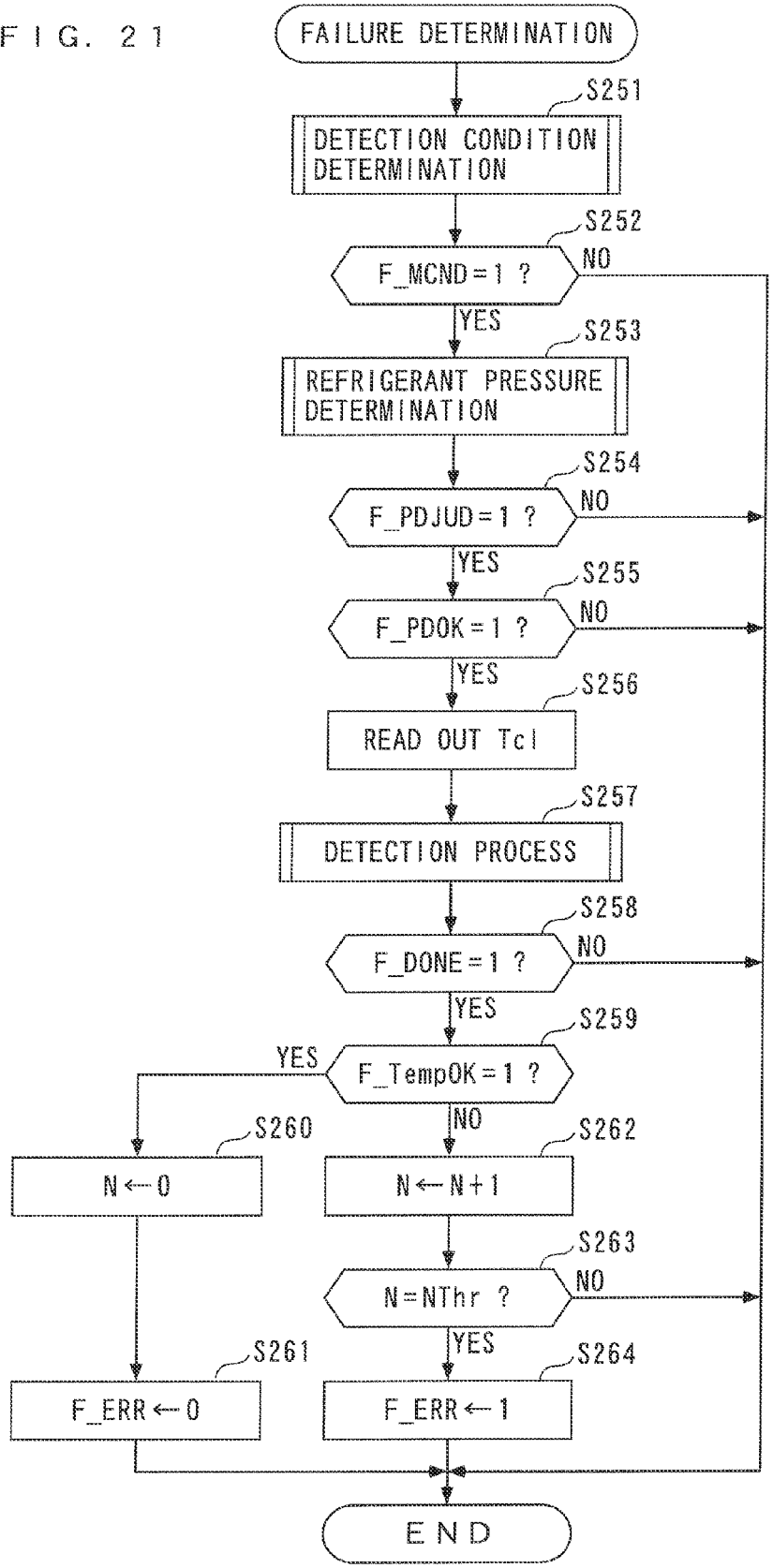
FIG. 21 A flowchart showing a failure determination process for the grille shutter device according to a second embodiment.

Next, a failure determination process for the grille shutter device 41 according to a second embodiment of the present invention will be described with reference to FIGS. 21 to 28. The above-described failure determination process according to the first embodiment determines a failure of the grille shutter device 41 based on the difference between the refrigerant pressure PD at the time of the lapse of the predetermined time period Tend after switching of the opening/closing command to the grille shutter device 41 upon engagement of the aircon clutch 14 and the refrigerant pressure PD at the time of switching of the opening/closing command. In contrast, in the failure determination process according to the present embodiment, the opening/closing command is switched upon engagement of the aircon clutch 14, and a failure of the grille shutter device 41 is determined based on the difference between peak values of the refrigerant pressure PD detected before and after the switching of the opening/closing command. FIG. 21 corresponds to a main routine therefor, while FIGS. 22 to 27 correspond to subroutines. Each process is executed whenever the predetermined time period dT elapses.

Figure 22:
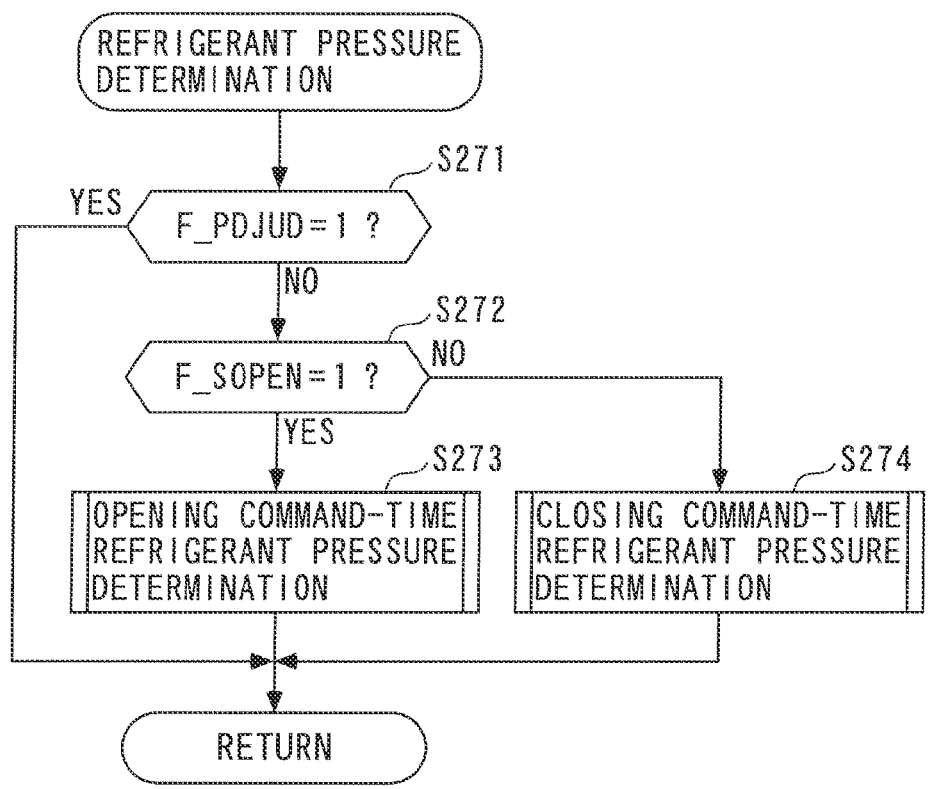
FIG. 22 A flowchart showing a detection process according to the second embodiment.

In the main routine of FIG. 21, first, in a step 251, the above-described detection condition determination process in FIG. 5 is executed. Next, it is determined in a step 252 whether or not the detecting condition satisfaction flag F_MCND set in the detection condition determination process is "1". If the answer to this question is negative (NO), the present process is immediately terminated. On the other hand, if the answer to the question of the above step 252 is affirmative (YES), i.e. if the detecting conditions are satisfied, in a step 253, a refrigerant pressure determination process is executed. This refrigerant pressure determination process determines whether or not the refrigerant pressure PD is in a stable state suitable for detecting a failure of the grille shutter device 41, and FIG. 22 shows a subroutine therefor.

In the present process, first, it is determined in a step 271 whether or not a refrigerant pressure determination completion flag F_PDJUD is "1". If the answer to this question is affirmative (YES), i.e. if the refrigerant pressure determination has been already completed, the present process is immediately terminated. On the other hand, if the answer to the question of the above step 271 is negative (NO), it is determined in a step 272 whether or not the opening command flag F_SOPEN is "1".

If the answer to this question is affirmative (YES), i.e. if the opening command has been output to the grille shutter device 41, in a step 273, an opening command-time refrigerant pressure determination process is executed, followed by terminating the present process. On the other hand, if the answer to the question of the above step 272 is negative (NO), i.e. if the closing command has been output to the grille shutter device 41, in a step 274, a closing command-time refrigerant pressure determination process, described hereinafter, is executed, followed by terminating the present process.

Figure 23:
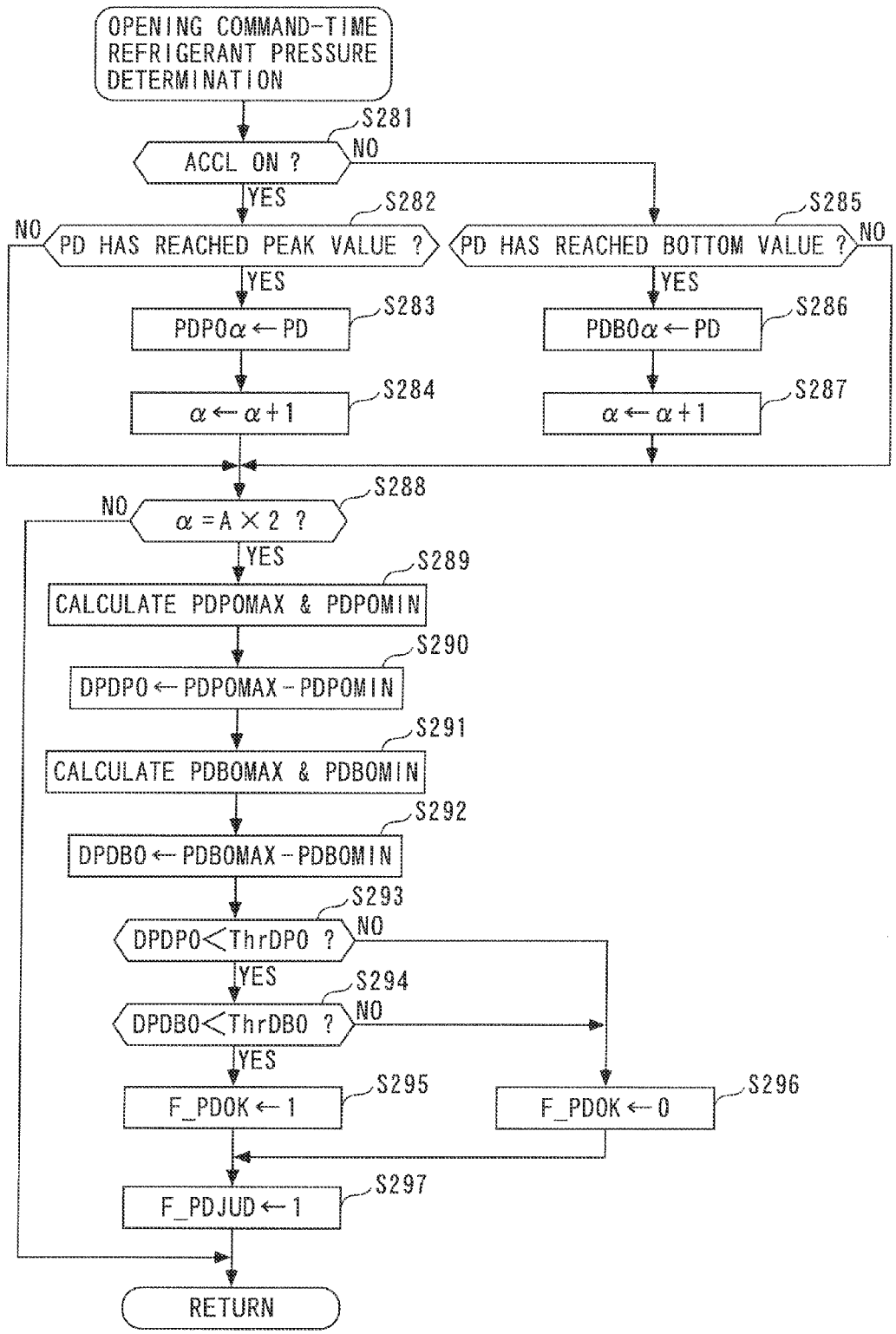
FIG. 23 A flowchart showing a refrigerant pressure determination process.

FIG. 23 shows the opening command-time refrigerant pressure determination process executed in the above step 273. In the present process, first, it is determined in a step 281 whether or not the aircon clutch 14 has been engaged. If the answer to this question is affirmative (YES), it is determined in a step 282 whether or not the refrigerant pressure PD has reached a peak value between the preceding execution and the present execution of this step. If the answer to this question is affirmative (YES), i.e. if it is immediately after the refrigerant pressure PD has reached a peak value, a value of the refrigerant pressure PD at the time is stored as an opening command-time peak pressure PDPOα (step 283), and further, in a step 284 a counter value α is incremented, and the process proceeds to a step 288, referred to hereinafter. On the other hand, if the answer to the question of the step 282 is negative (NO), i.e. if it is not immediately after the refrigerant pressure PD has reached a peak value, the steps 283 and 284 are skipped and the process proceeds to the step 288.

On the other hand, if the answer to the question of the above step 281 is negative (NO), i.e. if the aircon clutch 14 has been disengaged, it is determined in a step 285 whether or not the refrigerant pressure PD has reached a bottom value between the preceding execution and the present execution of this step. This is determined, for example, based on whether or not the amount of change in the refrigerant pressure PD has changed from a negative to approximately 0 (zero). If the answer to the question of the step 285 is affirmative (YES), i.e. if it is immediately after the refrigerant pressure PD has reached a bottom value, a value of the refrigerant pressure PD at the time is stored as an opening command-time bottom pressure PDBOα (step 286), and further, in a step 287 the counter value α is incremented, whereafter the process proceeds to the step 288. On the other hand, if the answer to the question of the step 285 is negative (NO), i.e. if it is not immediately after the refrigerant pressure PD has reached a bottom value, the steps 286 and 287 are skipped and the process proceeds to the step 288.

In the step 288, it is determined whether or not the counter value α has reached a double of a predetermined natural number A (=A×2). If the answer to this question is negative (NO), the present process is immediately terminated. On the other hand, if the answer to the question of the above step 288 is affirmative (YES), in a step 289, a maximum one of A values of the opening command-time peak pressure PDPOα stored in the step 283 is calculated as a maximum opening command-time peak pressure PDPOMAX, and a minimum one of them is calculated as a minimum opening command-time peak pressure PDPOMIN. Further, in a step 290, the difference between them (=PDPOMAX−PDPOMIN) is calculated as an opening command-time peak difference DPDPO.

Next, in a step 291, a maximum one of A values of the opening command-time bottom pressure PDBOα stored in the step 286 is calculated as a maximum opening command-time bottom pressure PDBOMAX, and a minimum one of them is calculated as a minimum opening command-time bottom pressure PDBOMIN. Further, in a step 292, the difference between them (=PDBOMAX−PDBOMIN) is calculated as an opening command-time bottom difference DPDBO.

Next, in a step 293, it is determined whether or not the opening command-time peak difference DPDPO is smaller than a predetermined value ThrDPO, and in a step 294, it is determined whether or not the opening command-time bottom difference DPDBO is smaller than a predetermined value ThrDBO. If both of the answers to these questions are affirmative (YES), it is determined that the refrigerant pressure PD is in a stable state suitable for determining a failure of the grille shutter device 41, and to indicate this, in a step 295, a refrigerant pressure stable flag F_PDOK is set to "1", whereafter the process proceeds to a step 297.

On the other hand, if either of the answers to the questions of the above steps 293 and 294 is negative (NO), it is determined that the refrigerant pressure PD is not in a stable state suitable for failure determination, and to indicate this, in a step 296, the refrigerant pressure stable flag F_PDOK is set to "0", whereafter the process proceeds to the step 297.

In the step 297 following the above step 295 or 297, to indicate that the opening command-time refrigerant pressure determination process is completed, a refrigerant pressure determination completion flag F_PDJUD is set to "1", followed by terminating the present process.

Figure 24:
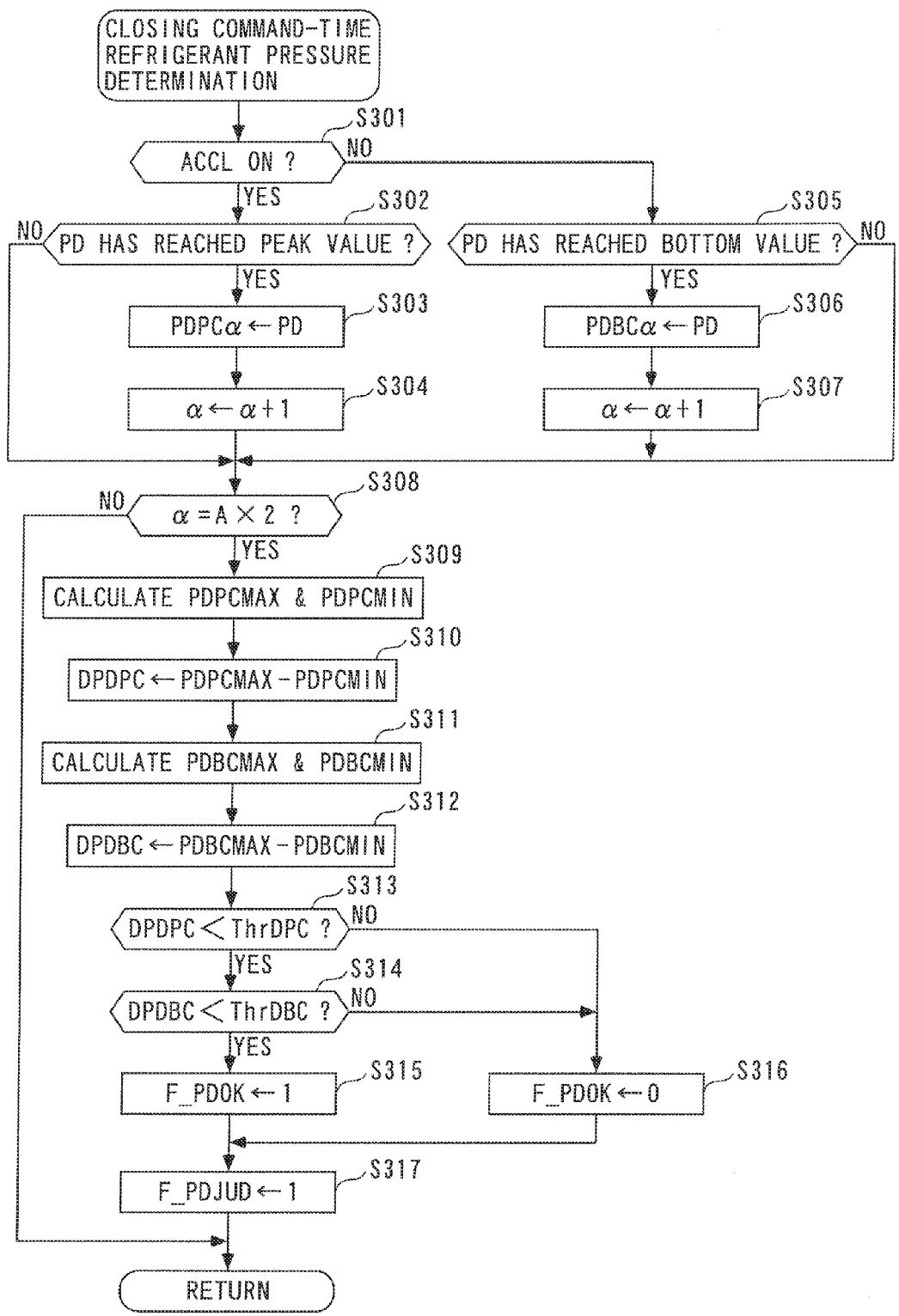
FIG. 24 A flowchart showing an opening command-time refrigerant pressure determination process.

FIG. 24 shows the closing command-time refrigerant pressure determination process executed in the step 274 in FIG. 22. In the present process, first, it is determined in a step 301 whether or not the aircon clutch 14 has been engaged. If the answer to this question is affirmative (YES), it is determined in a step 302 whether or not the refrigerant pressure PD has reached a peak value between the preceding execution and the present execution of this step. If the answer to this question is affirmative (YES), i.e. if it is immediately after the refrigerant pressure PD has reached a peak value, the refrigerant pressure PD at the time is stored as a closing command-time peak pressure PDPCα (step 303), and further, in a step 304, the counter value α is incremented, whereafter the process proceeds to a step 308, referred to hereinafter. On the other hand, if the answer to the question of the step 302 is negative (NO), i.e. if it is not immediately after the refrigerant pressure PD has reached a peak value, the steps 303 and 304 are skipped and the process proceeds to the step 308.

On the other hand, if the answer to the question of the above step 301 is negative (NO), i.e. if the aircon clutch 14 has been disengaged, it is determined in a step 305 whether or not the refrigerant pressure PD has reached a bottom value between the preceding execution and the present execution of this step. If the answer to this question is affirmative (YES), i.e. if it is immediately after the refrigerant pressure PD has reached a bottom value, the refrigerant pressure PD at the time is stored as a closing command-time bottom pressure PDBCα (step 306), and further, in a step 307 the counter value α is incremented, whereafter the process proceeds to the step 308. On the other hand, if the answer to the question of the step 305 is negative (NO), i.e. if it is not immediately after the refrigerant pressure PD has reached a bottom value, the steps 306 and 307 are skipped and the process proceeds to the step 308.

In the step 308, it is determined whether or not the counter value α has reached a double of a predetermined natural number A (=A×2). If the answer to this question is negative (NO), the present process is immediately terminated. On the other hand, if the answer to the above question of the step 308 is affirmative (YES), in a step 309, a maximum one of A values of the closing command-time peak pressure PDPCα stored in the above step 303 is calculated as a maximum closing command-time peak pressure PDPCMAX, and a minimum one of them is calculated as a minimum closing command-time peak pressure PDPCMIN. Further, in a step 310, the difference between them (=PDPCMAX−PDPC-MIN) is calculated as a closing command-time peak difference DPDPC.

Next, in a step 311, a maximum one of A values of the closing command-time bottom pressure PDBCα stored in the above step 306 is calculated as a maximum closing command-time bottom pressure PDBCMAX, and a minimum one of them is calculated as a minimum closing command-time bottom pressure PDBCMIN. Further, in a step 312, the difference between them (=PDBCMAX−PDBCMIN) is calculated as a closing command-time bottom difference DPDBC.

Next, in a step 313, it is determined whether or not the closing command-time peak difference DPDPC is smaller than a predetermined value ThrDPC, and in a step 314, it is determined whether or not the closing command-time bottom difference DPDBC is smaller than a predetermined value ThrDBC. If both of the answers to these questions are affirmative (YES), it is determined that the refrigerant pressure PD is in a stable state suitable for determining a failure of the grille shutter device 41, and to indicate this, in a step 315, the refrigerant pressure stable flag F_PDOK is set to "1", whereafter the process proceeds to a step 317.

On the other hand, if either of the answers to the questions of the above steps 313 and 314 is negative (NO), it is determined that the refrigerant pressure PD is not in a stable state suitable for failure determination, and to indicate this, in a step 316, the refrigerant pressure stable flag F_PDOK is set to "0", whereafter the process proceeds to the step 317.

In the step 317 following the above step 315 or 316, to indicate that the closing command-time refrigerant pressure determination process is completed, the refrigerant pressure determination completion flag F_PDJUD is set to "1", followed by terminating the present process.

Referring again to FIG. 21, in a step 254 following the refrigerant pressure determination process in the step 253, it is determined whether or not the refrigerant pressure determination completion flag F_PDJUD is "1". If the answer to this question is negative (NO), i.e. if the refrigerant pressure determination has not yet been completed, the present process is immediately terminated. On the other hand, if the answer to the question of the above step 254 is affirmative (YES), it is determined in a step 255 whether or not the refrigerant pressure stable flag F_PDOK is "1". If the answer to this question is negative (NO), the present process is immediately terminated. On the other hand, if the answer to this question is affirmative (YES), in a step 256, the aircon operation time period Tcl is read out.

Figure 25:
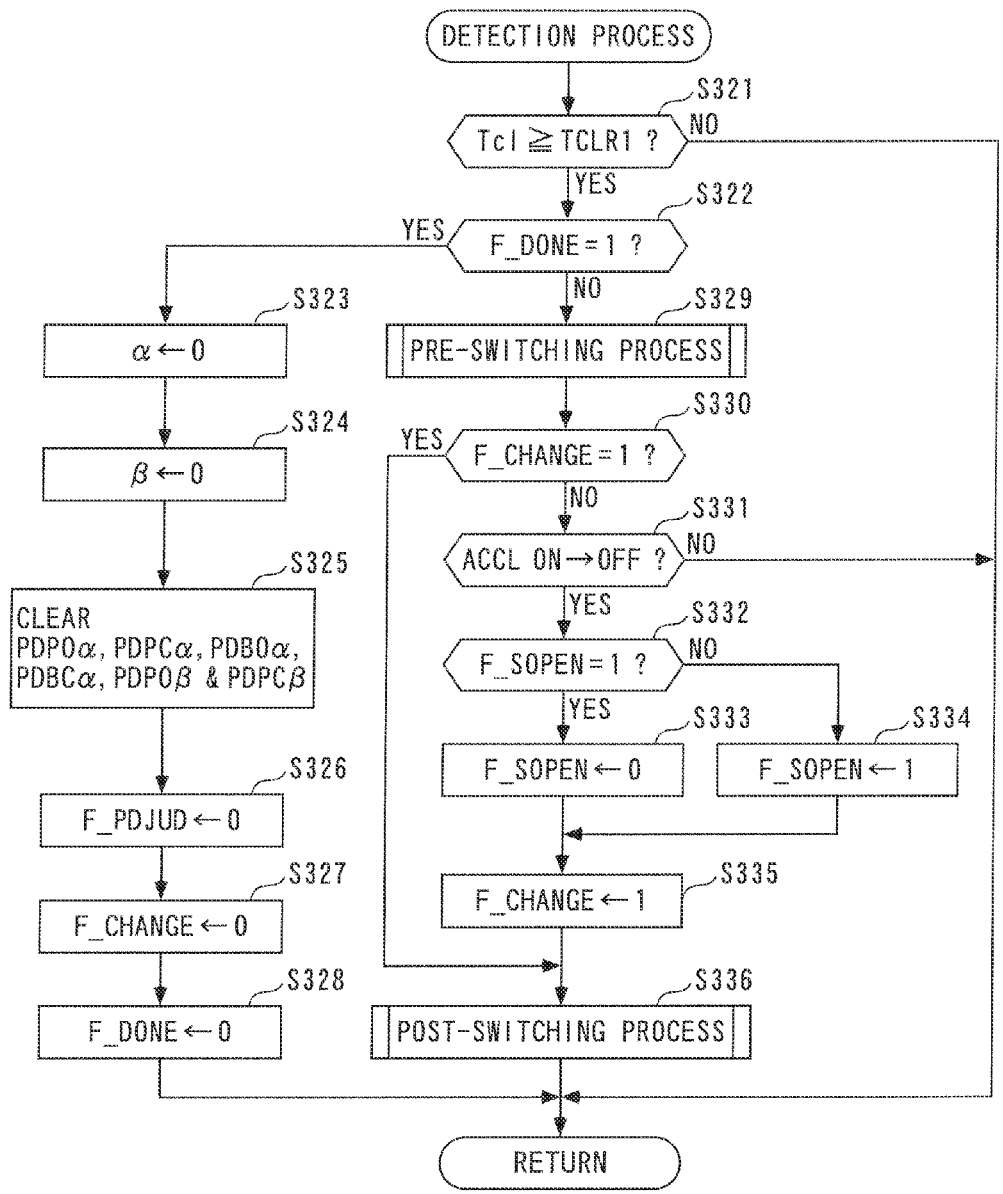
FIG. 25 A flowchart showing a closing command-time refrigerant pressure determination process.

Next, in a step 257, a failure detection process for the grille shutter device 41 is executed. FIG. 25 shows a subroutine therefor. In the present process, first, it is determined in a step 321 whether or not the aircon operation time period Tcl is not shorter than a first predetermined time period TCLR1 which is longer than the minimum time period TclLL. If the answer to this question is negative (NO), the present process is immediately terminated.

On the other hand, if the answer to the question of the above step 321 is affirmative (YES), i.e. if Tcl TCLR1 holds, it is determined in a step 322 whether or not the detection completion flag F_DONE is "1". This detection completion flag F_DONE is set to "1" when a post-switching process, described hereinafter, is once terminated. If the answer to the question of this step 322 is affirmative (YES), the above-mentioned counter value α and a counter value β, referred to hereinafter, are reset to 0, respectively (steps 323 and 324), the stored opening command-time peak pressure PDPOα, a stored opening command-time peak pressure PDPOβ, the closing command-time peak pressure PDPCα, a closing command-time peak pressure PDPCβ, the opening command-time bottom pressure PDBOα, and the closing command-time bottom pressure PDBCα are all cleared (step 325), and, the refrigerant pressure determination completion flag F_PD-JUD, an opening/closing command switching flag F_CHANGE, and the detection completion flag F_DONE are reset to "0", respectively (steps 326 to 328), followed by terminating the present process. On the other hand, if the answer to the question of the above step 322 is negative (NO), in a step 329, a pre-switching process is executed.

Figure 26:
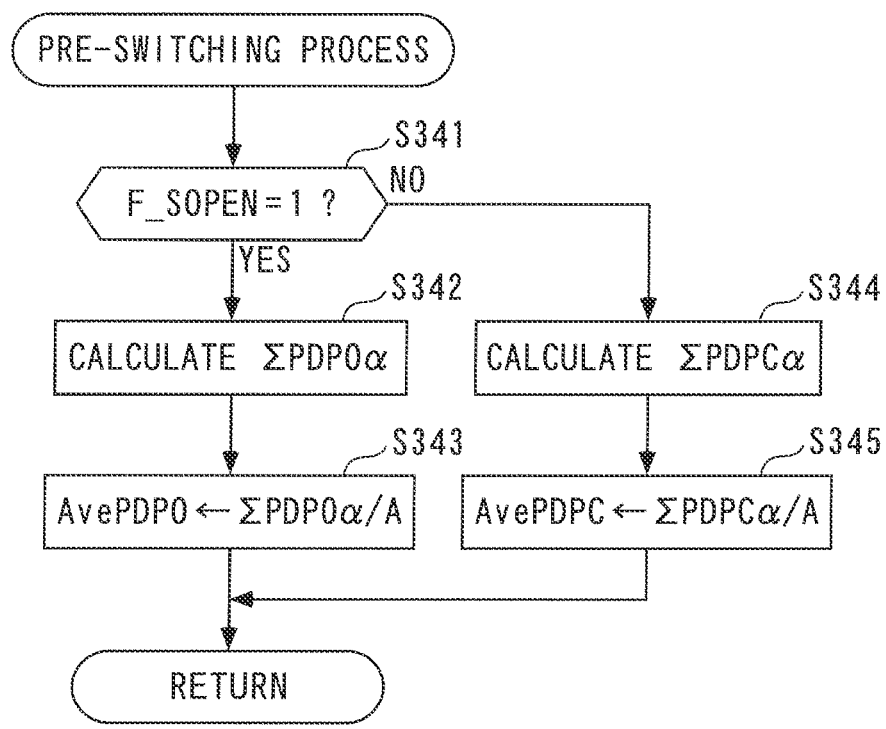
FIG. 26 A flowchart showing a pre-switching process according to the second embodiment.

FIG. 26 shows a subroutine for this pre-switching process. In the present process, first, it is determined in a step 341 whether or not the opening command flag F_SOPEN is "1". If the answer to this question is affirmative (YES), i.e. if the opening command has been output to the grille shutter device 41, a total ΣPDPOα of A values of the opening command time peak pressure PDPOα stored in the step 283 in FIG. 23 is calculated (step 342), and further, an average value AvePDPO thereof (=ΣPDPOα/A) is calculated (step 343), followed by terminating the present process.

On the other hand, if the answer to the question of the above step 341 is negative (NO), i.e. if the closing command has been output to the grille shutter device 41, a total ΣPDPCα of A values of the closing command time peak pressure PDPCα stored in the step 303 in FIG. 24 is calculated (step 344), and further, an average value AvePDPC thereof (=ΣPDPCα/A) is calculated (step 345), followed by terminating the present process.

Referring again to FIG. 25, in a step 330 following the step 329, it is determined whether or not the opening/closing command switching flag F_CHANGE is "1". If the answer to this question is negative (NO), it is determined in a step 331 whether or not the aircon clutch 14 has been switched to the disengaged state between the preceding execution and the present execution of this step. If the answer to this question is negative (NO), the present process is immediately terminated.

On the other hand, if the answer to the question of the above step 331 is affirmative (YES), i.e. if it is immediately after the aircon clutch 14 has been disengaged, it is determined in a step 332 whether or not the opening command flag F_SOPEN is "1". If the answer to this question is affirmative (YES), i.e. if the opening command has been output to the grille shutter device 41 up to the time, in a step 333, the opening command flag F_SOPEN is changed to "0". This causes the opening/closing command to the grille shutter device 41 to be switched from the opening command to the closing command.

On the other hand, if the answer to the question of the above step 332 is negative (NO), i.e. if the closing command has been output to the grille shutter device 41 up to the time, in a step 334, the opening command flag F_SOPEN is changed to "1". This causes the opening/closing command to the grille shutter device 41 to be switched from the closing command to the opening command.

In a step 335 following the above step 333 or 334, to indicate that the opening/closing command to the grille shutter device 41 has been switched after termination of the pre-switching process, the opening/closing command switching flag F_CHANGE is set to "1", and the process proceeds to a step 336.

On the other hand, if the answer to the question of the above step 330 is affirmative (YES), the steps 331 to 335 are skipped and the process proceeds to the step 336.

In the step 336 executed when the answer to the question of the above step 330 is affirmative (YES) or subsequent to the above step 335, the post-switching process is executed, followed by terminating the process in FIG. 25. FIG. 27 shows a subroutine for the post-switching process. In the present process, first, it is determined in a step 351 whether or not the aircon clutch 14 has been engaged. If the answer to this question is negative (NO), the present process is immediately terminated. On the other hand, if the answer to the question of the step 351 is affirmative (YES), i.e. if the aircon clutch 14 has been engaged, it is determined in a step 352 whether or not the opening command flag F_SOPEN is "1".

If the answer to this question is negative (NO), i.e. if the closing command has been output to the grille shutter device 41, which means that the opening/closing command to the grille shutter device 41 has been switched from the opening command to the closing command after the pre-switching process, it is determined in a step 353 whether or not the refrigerant pressure PD has reached a peak value between the preceding execution and the present execution of this step. If the answer to this question is negative (NO), i.e. if it is not immediately after the refrigerant pressure PD has reached a peak value, the present process is immediately terminated. On the other hand, if the answer to the question of the above step 353 is affirmative (YES), i.e. if it is immediately after the refrigerant pressure PD has reached a peak value, the refrigerant pressure PD at the time is stored as the opening command-time peak pressure PDPO$\beta$ (step 354), and further, in a step 355, the counter value $\beta$ is incremented.

Next, it is determined in a step 356 whether or not the counter value $\beta$ has reached a predetermined value B. If the answer to this question is negative (NO), the present process is immediately terminated. On the other hand, if the answer to the question of the above step 356 is affirmative (YES), i.e. if the counter value $\beta$ has reached the predetermined value B, in a step 357, the maximum one of B values of the opening command-time peak pressure PDPO$\beta$ stored in the above step 354 is calculated as the maximum closing command-time peak pressure PDPCMAX, and further, in a step 358, the difference between this maximum closing command-time peak pressure PDPCMAX and the average value AvePDPO of the opening command time peak pressure PDPO$\alpha$ calculated in the step 343 in FIG. 26 (=PDPCMAX−AvePDPO) is calculated as the peak difference DPDP, and the process proceeds to a step 365, referred to hereinafter.

As described above, as the refrigerant pressure PD used for failure determination, in the pre-switching process, the average value AvePDPO of the opening command time peak pressure PDPO$\alpha$ is calculated, whereas in the post-switching process, the maximum value of the closing command-time peak pressure PDPC$\beta$ (the maximum closing command-time peak pressure PDPCMAX) is calculated. This is for the following reason.

For example, as shown in FIG. 28, in a case where the opening/closing command is switched from the opening command to the closing command, before the switching, the grille shutter 47 is held open (to t1), so that the opening command-time peak pressure PDPO$\alpha$ (PDPO0 to PDPO2) obtained at the time of engagement of the air clutch 14 is stable and its fluctuation is small. On the contrary, immediately after switching of the opening/closing command from the opening command to the closing command, the grille shutter 47 is changed from the open state to the closed state, and hence the closing command-time peak pressure PDPC$\beta$ obtained at the time of engagement of the aircon clutch 14 increases with some delay until it reaches its intrinsic value (PDPC2). The reason is so as to exclude the influence of such delay.

On the other hand, if the answer to the question of the step 352 is affirmative (YES), i.e. if the opening command has been output to the grille shutter device 41, which means that the opening/closing command to the grille shutter device 41 has been switched from the closing command to the opening command after the pre-switching process, it is determined in a step 359 whether or not the refrigerant pressure PD has reached a peak value between the preceding execution and the present execution of this step. If the answer to this question is negative (NO), i.e. if it is not immediately after the refrigerant pressure PD has reached a peak value, the present process is immediately terminated. On the other hand, if the answer to the question of the above step 359 is affirmative (YES), i.e. if it is immediately after the refrigerant pressure PD has reached a peak value, a value of the refrigerant pressure PD at the time is stored as the opening command-time peak pressure PDPO$\beta$ (step 360), and further, in a step 361 the counter value $\beta$ is incremented.

Next, it is determined in a step 362 whether or not the counter value $\beta$ has reached the predetermined value B. If the answer to this question is negative (NO), the present process is immediately terminated. On the other hand, if the answer to the question of the above step 362 is affirmative (YES), i.e. if the counter value $\beta$ has reached the predetermined value B, in a step 363, a minimum one of B values of the closing command-time peak pressure PDPC$\beta$ stored in the above step 360 is calculated as the minimum opening command-time peak pressure PDPOMIN, and further, in a step 364, the difference between the average value AvePDPC of the closing command-time peak pressure PDPC$\alpha$ calculated in the step 343 in FIG. 26 and the minimum opening command-time peak pressure PDPOMIN (=AvePDPC−PDPOMIN) is calculated as the peak difference DPDP, and the process proceeds to the step 365.

As described above, as the refrigerant pressure PD used for failure determination, in the pre-switching process, the average value AvePDPC of the closing command-time peak pressure PDPCα is calculated, whereas in the post-switching process, the minimum value of the opening command-time peak pressure PDPOβ (the minimum opening command-time peak pressure PDPOMIN) is calculated. The reason is, similarly to the above-described case of switching from the opening command to the closing command, that immediately after the switching, the opening command-time peak pressure PDPOβ obtained at the time of engagement of the aircon clutch 14 decreases with some delay until it reaches its intrinsic value, and hence so as to exclude influence of such delay.

In the step 365 following the above step 358 or 364, the present value of the peak difference DDPDP for determination use is calculated using the calculated peak difference DPDP by the following equation (1):

$$DDPDP = DPDP \times (1 - Knam) + DDPDP \times Knam \quad (1)$$

wherein DDPDP on the right-hand side is the immediately preceding value of the peak difference for determination use, and Knam is a predetermined averaging coefficient (0<Knam<1).

As is clear from this equation (1), the peak difference DDPDP for determination use is a weighted average value of the peak difference DPDP and the immediately preceding value of the peak difference DDPDP for determination use, and the averaging coefficient Knam is a weighting coefficient of the weighted averaging. Accordingly, the present value of the peak difference DDPDP for determination use is calculated to be closer to the peak difference DPDP as the averaging coefficient Knam is smaller, and is calculated to be closer to the immediately preceding value of the peak difference DDPDP for determination use as the averaging coefficient Knam is larger.

Next, it is determined in a step 366 whether or not the peak difference DDPDP for determination use is not larger than a predetermined threshold value Thr4. If the answer to this question is negative (NO), i.e. if DDPDP>Thr4 holds, which means that the difference of the peak value of the refrigerant pressure PD between when the closing command was output to the grille shutter device 41 and when the opening command was output to the same, during the operation of the aircon 32, is large, it is judged that the grille shutter 47 was opened and closed according to the opening/closing command, so that it is determined that the grille shutter device 41 is normal, and to indicate this, in a step 368, the normal determination flag F_TempOK is set to "1".

On the other hand, if the answer to the question of the above step 366 is affirmative (YES), i.e. if DDPDP≤Thr4 holds, which means that the difference of the peak value of the refrigerant pressure PD between when the closing command was output to the grille shutter device 41 and when the opening command was output to the same, during the operation of the aircon 32, is small, it is judged that the grille shutter 47 was not opened and closed according to the opening/closing command, so that it is determined that the grille shutter device 41 is abnormal, and to indicate this, in a step 367, the normal determination flag F_TempOK is set to "0".

In a step 369 following the above step 367 or 368, to indicate that the above-described series of pre-switching process and post-switching process are terminated, the detection completion flag F_DONE is set to "1", followed by terminating the present process. When the detection completion flag F_DONE is set to "1" as described above, the answer to the question of the step 322 in FIG. 25 becomes affirmative (YES), and accordingly, in the step 328, the detection completion flag F_DONE is reset to "0", whereafter the pre-switching process and the post-switching process are repeated.

Referring again to FIG. 21, in a step 258 following the detection process in the step 257, it is determined whether or not the detection completion flag F_DONE is "1". If the answer to this question is negative (NO), the present process is terminated. On the other hand, if the answer to the question of the above step 258 is affirmative (YES), i.e. if it is immediately after termination of the series of pre-switching process and post-switching process, it is determined in a step 259 whether or not the normal determination flag F_TempOK is "1".

If the answer to this question is affirmative (YES), i.e. if it is determined that the grille shutter device 41 is normal in the detection process, in a step 260, the counter value N is reset to 0, and further, it is finally determined that the grille shutter device 41 is normal and to indicate this, in a step 261, the failure final determination flag F_ERR is set to "0", followed by terminating the present process. Note that similarly to the above-described first embodiment, the counter value N is also reset to 0 when the ignition switch is turned off.

On the other hand, if the answer to the question of the above step 259 is negative (NO), i.e. if it is determined that the grille shutter device 41 is abnormal in the detection process, in a step 262, the counter value N is incremented, and it is determined in a step 263 whether or not the counter value N has reached the predetermined value NThr. If the answer to this question is negative (NO), the present process is immediately terminated. On the other hand, if the answer to the question of the step 263 is affirmative (YES), i.e. if the counter value N has reached the predetermined value NThr, which means that the determination that the grille shutter device 41 is abnormal has been given by the detection process continuously a number of times equal in number to the predetermined value NThr, it is finally determined that the grille shutter device 41 is in failure, and to indicate this, in a step 264, the failure final determination flag F_ERR is set to "1", followed by terminating the present process.

FIG. 28 is a timing diagram showing an operation example obtained by the above-described pre-switching process and post-switching process in a case where the opening/closing command to the grille shutter device 41 is switched from the opening command to the closing command. In this example, up to a timing t1, in the state in which the opening/closing command to the grille shutter device 41 is maintained to be the opening command, the engagement/disengagement of the aircon clutch 14 is repeated three times. During this time period, values of the refrigerant pressure PD detected in respective times are stored as opening command-time peak pressure values PDPO0 to PDPO2 and opening command-time bottom pressure values PDBO0 to PDBO2 (steps 283 and 286 in FIG. 23), the opening command-time refrigerant pressure determination is performed using them (steps 293 to 296 in FIG. 23), and further, the average value AvePDPO of the opening command-time peak pressure values PDPO0 to PDPO2 is calculated (step 343 in FIG. 26).

Subsequently, immediately after the third disengagement of the aircon clutch 14, the opening/closing command to the grille shutter device 41 is switched from the opening command to the closing command (step 333 in FIG. 25), and in the state in which the opening/closing command to the grille shutter device 41 is maintained to be the closing command, the engagement/disengagement of the aircon clutch 14 is repeated three more times. During this time period, values of the refrigerant pressure PD detected in respective times are stored as the closing command-time peak pressure values PDPC0 to PDPC2 (step 354 in FIG. 27), and PDPC2 which is the largest value of them is calculated as the maximum closing command-time peak pressure PDPCMAX (step 357 in FIG. 27).

Further, the difference between this maximum closing command-time peak pressure PDPCMAX and the average value AvePDPO (=PDPCMAX−AvePDPO) is calculated as the peak difference DDPDP for determination use (step 358 in FIG. 27), and when the peak difference DDPDP for determination use is not larger than the predetermined threshold value Thr4, it is determined that the grille shutter device 41 is abnormal (step 367 in FIG. 27).

As described above, according to the present embodiment, after the pre-switching process is terminated, the opening/closing command to the grille shutter device 41 is switched between the opening command and the closing command immediately after disengagement of the aircon clutch 14, and hence it is possible to reliably terminate the opening/closing of the grille shutter 47 after the opening/closing command is switched and before the aircon clutch 14 is engaged. This makes it possible to properly acquire the opening command-time peak pressure PDPOβ and the closing command-time peak pressure PDPCβ after the switching of the opening/closing of the grille shutter 47 while avoiding influence of delay of the opening/closing of the grille shutter 47. As a result, it is possible to more properly determine a failure of the grille shutter device 41.

Further, before and after the switching of the opening/closing command to the grille shutter device 41, the opening command-time peak pressures PDPOα and PDPOβ, and the closing command-time peak pressures PDPCα and PDPCβ are stored, and the failure determination of the grille shutter device 41 is performed using them, which enables both of the refrigerant pressure PD during the pre-switching process and the refrigerant pressure PD during the post-switching process, for use in determination, to be properly acquired at definite points each of which can be used as a reference for the refrigerant pressure PD that rises according to the engagement of the aircon clutch, whereby it is possible to secure the accuracy of failure determination of the grille shutter device 41.

Further, as the refrigerant pressure PD during the post-switching process, the maximum closing command-time peak pressure PDPCMAX and the minimum opening command-time peak pressure PDPOMIN are used, and hence it is possible to avoid influence of delay of the increase of the closing command-time peak pressure PDPCβ and delay of the decrease of the opening command-time peak pressure PDPOβ, obtained at the time of the engagement of the aircon clutch 14, and it is possible to further properly determine a failure of the grille shutter device 41.

Further, as the peak difference DDPDP for determination use, the weighted average value of the peak difference DPDP and the immediately preceding value of the peak difference DDPDP for determination use is used, and hence it is possible to avoid influence of fluctuation of the engine speed NE, and thereby further enhance the accuracy of failure determination of the grille shutter device 41.

Further, note that the present invention is by no means limited to the above-described embodiments, but can be practiced in various forms. For example, although in the first embodiment, in the first detection process, the opening/closing command is switched when the aircon clutch 14 is engaged, this is not limitative, but the opening/closing command may be switched at the time of the lapse of a predetermined delay time after engagement of the aircon clutch 14.

Further, although in the embodiments, it is described that the counter value N indicating the number of times of determination that the grille shutter device 41 is abnormal in the detection process is reset to 0 when the ignition switch is turned off, the counter value N may be held at the time.

Further, although in the embodiments, when the counter value N has reached the predetermined value NThr, which means that the detection process has given the determination that the grille shutter device 41 is abnormal continuously a number of times equal in number to the predetermined value NThr, it is finally determined that the grille shutter device 41 is in failure, it may be finally determined that the grille shutter device 41 is in failure, immediately after the grille shutter device 41 is determined to be abnormal, e.g. by setting the predetermined value NThr=1.

Further, although in the first embodiment, as the predetermined time period Tend for defining the sampling timing of the end values PDend and JudPDend, the same value is used both in the pre-switching process and the post-switching process, different values may be used, or alternatively, the predetermined time period Tend may be set according to the aircon operation time period Tcl or the like. Further, as the timing serving as the reference for the sampling timing of the end values PDend and JudPDend, in the first pre-switching process and post-switching process, the timing in which the aircon clutch 14 is engaged is used, in the second pre-switching process and post-switching process, the timing in which the refrigerant pressure PD has reached a peak value is used, and in the third pre-switching process and post-switching process, the timing in which the refrigerant pressure PD has converged is used. However, as for the pre-switching process, the timing different from that for the post-switching process of these three timings may be used.

Further, although in the second embodiment, as the peak values of the refrigerant pressure PD during the post-switching process, for use in failure determination, the maximum closing command-time peak pressure PDPCMAX and the minimum opening command-time peak pressure PDPOMIN are used, they may be only required to be those calculated according to the closing command-time peak pressure PDPCβ and the opening command-time peak pressure PDPOβ stored in the post-switching process, and may be the closing command-time peak pressure PDPCβ and the opening command-time peak pressure PDPOβ themselves.

Further, although the embodiments are examples of application of the present invention to the vehicle that mounts the gasoline engine, this is not limitative, but the present invention may be applied to any suitable vehicle that mounts one of various engines other than the gasoline engine, such as a diesel engine, and may be applied to a hybrid vehicle that uses an engine and an electric motor in combination, as well as to an electric motor vehicle which uses only an electric motor. It is to be further understood that various changes and modifications may be made without departing from the spirit and scope of the present invention.

INDUSTRIAL APPLICABILITY

As described heretofore, the failure determination device according to the present invention is useful for determining failure for the shutter device for introducing ambient air into the engine room of the vehicle with accuracy in a short time period.

REFERENCE SIGNS LIST 1 failure determination device
2 ECU (failure determination means, opening/closing control means, reference timing-setting means, opening/closing command-switching means, duration acquisition means, average value-calculating means, operation condition acquisition means, and failure determination inhibition means)
3 engine
11 condenser
13 compressor
14 aircon clutch
32 aircon
41 grille shutter device (shutter device)
42 front grill (front opening)
47 grille shutter (shutter)
V vehicle
PD refrigerant pressure
DDPD refrigerant pressure difference for determination use (difference between closing command-time refrigerant pressure and opening command-time refrigerant pressure, difference from average value)
Thr predetermined value
Tend predetermined time period
Tcl aircon operation time period (duration of engaged state of aircon clutch)
PDPO opening command-time peak pressure (refrigerant pressure detected when refrigerant pressure has reached peak value)
PDPC closing command-time peak pressure (refrigerant pressure detected when refrigerant pressure has reached peak value)

The invention claimed is:

1. A failure determination device for determining a failure of a shutter device of a vehicle that has an engine room provided with a condenser of a refrigeration cycle for an aircon, and has a front opening provided with a shutter which can be opened and closed, the shutter device being provided for introducing ambient air into the engine room for cooling the condenser by opening the shutter, comprising:
   refrigerant pressure detection means for detecting a pressure of a refrigerant discharged from the condenser as a refrigerant pressure; and
   failure determination means for determining a failure of the shutter device based on the detected refrigerant pressure;
   opening/closing control means for controlling opening/closing of the shutter by outputting an opening command or a closing command to the shutter device as an opening/closing command,
   wherein said failure determination means determines that a failure has occurred in the shutter device when a difference between a closing command-time refrigerant pressure which is a refrigerant pressure detected when the closing command has output from said opening/closing control means and an opening command-time refrigerant pressure which is a refrigerant pressure detected when the opening command has output, during operation of the aircon, is not larger than a predetermined value.

2. The failure determination device as claimed in claim 1, further comprising:
   reference timing-setting means for setting a reference timing at which the opening/closing command from said opening/closing control means is switched; and
   opening/closing command-switching means for switching the opening/closing command between the opening command and the closing command at the set reference timing, and
   wherein the refrigeration cycle has a compressor for compressing and pressurizing the refrigerant,
   wherein the aircon has an aircon clutch for engaging/disengaging between the compressor and a driving source of the compressor, and
   wherein said reference timing-setting means sets a timing in which the aircon clutch is disengaged, as the reference timing.

3. The failure determination device as claimed in claim 2, wherein said failure determination means uses values of the refrigerant pressure detected when the refrigerant pressure has reached a peak after the aircon clutch is engaged, before and after the reference timing, as the closing command-time refrigerant pressure and the opening command-time refrigerant pressure.

4. The failure determination device as claimed in claim 1, further comprising:
   reference timing-setting means for setting a reference timing at which the opening/closing command from said opening/closing control means is switched; and
   opening/closing command-switching means for switching the opening/closing command between the closing command and the opening command at the set reference timing, and
   wherein said failure determination means uses the refrigerant pressure detected when a predetermined time has elapsed after the opening/closing command is switched at the reference timing, as the closing command-time refrigerant pressure or the opening command-time refrigerant pressure.

5. The failure determination device as claimed in claim 4, wherein the refrigeration cycle has a compressor for compressing and pressurizing the refrigerant,
   wherein the aircon has an aircon clutch for engaging/disengaging between the compressor and a driving source of the compressor, and
   wherein said reference timing-setting means sets a timing in which a predetermined delay time period has elapsed after the aircon clutch is engaged, as the reference timing.

6. The failure determination device as claimed in claim 4, wherein the refrigeration cycle has a compressor for compressing and pressurizing the refrigerant,
   wherein the aircon has an aircon clutch for engaging/disengaging between the compressor and a driving source of the compressor, and
   wherein said reference timing-setting means sets a timing at which the refrigerant pressure has converged after the aircon clutch is engaged, as the reference timing.

7. The failure determination device as claimed in claim 4, wherein the refrigeration cycle has a compressor for compressing and pressurizing the refrigerant,
   wherein the aircon has an aircon clutch for engaging/disengaging between the compressor and a driving source of the compressor, and
   wherein said reference timing-setting means sets a timing at which the refrigerant pressure has reached a peak after the aircon clutch is engaged, as the reference timing.

8. The failure determination device as claimed in claim 4, further comprising:
   duration acquisition means for acquiring a duration of an engaged state of the aircon clutch, and wherein said reference timing-setting means sets the reference timing according to the acquired duration.

9. The failure determination device as claimed in claim 4, further comprising:
average value-calculating means for calculating an average value of a plurality of values of the refrigerant pressure detected in a state in which the aircon clutch is engaged, when the engagement/disengagement of the aircon clutch is repeated a plurality of times in a state in which the opening/closing command from said opening/closing control means is maintained to be one of the opening command and the closing command, respectively, and
wherein said failure determination means determines a failure of the shutter device based on a difference between the refrigerant pressure detected when a predetermined time has elapsed after the opening/closing command is switched from the state maintained to be one of the opening command and the closing command to a state maintained to be the other, and the calculated average value.

10. A failure determination device for determining a failure of a shutter device of a vehicle that has an engine room provided with a condenser of a refrigeration cycle for an aircon, and has a front opening provided with a shutter which can be opened and closed, the shutter device being provided for introducing ambient air into the engine room for cooling the condenser by opening the shutter, comprising:
refrigerant pressure detection means for detecting a pressure of a refrigerant discharged from the condenser as a refrigerant pressure;
failure determination means for determining a failure of the shutter device based on the detected refrigerant pressure;
operation condition acquisition means for acquiring operation conditions of the aircon; and
failure determination inhibition means for inhibiting failure determination of the shutter device by said failure determination means when the acquired operation conditions of the aircon are different between when the closing command is output and when the opening command is output.

* * * * *